United States Patent [19]
Kado et al.

[11] Patent Number: 6,101,164
[45] Date of Patent: Aug. 8, 2000

[54] HIGH DENSITY RECORDING BY A CONDUCTIVE PROBE CONTACT WITH PHASE CHANGE RECORDING LAYER

[75] Inventors: Hiroyuki Kado, Osaka; Takao Tohda, Ikoma; Osamu Kusumoto, Kyoto; Kazuo Yokoyama, Hirakata, all of Japan

[73] Assignee: Matsushita Electric Industrial Co., Ltd., Osaka, Japan

[21] Appl. No.: 08/760,420

[22] Filed: Dec. 4, 1996

Related U.S. Application Data

[63] Continuation of application No. 08/377,364, Jan. 24, 1995, abandoned.

[30] Foreign Application Priority Data

| Jan. 31, 1994 | [JP] | Japan | 6-009076 |
| Apr. 11, 1994 | [JP] | Japan | 6-071784 |
| Apr. 14, 1994 | [JP] | Japan | 6-076066 |
| Apr. 14, 1994 | [JP] | Japan | 6-076067 |
| Jun. 8, 1994 | [JP] | Japan | 6-126172 |
| Dec. 1, 1994 | [JP] | Japan | 6-298510 |
| Dec. 8, 1994 | [JP] | Japan | 6-305143 |

[51] Int. Cl.[7] ........................................ G11B 9/00
[52] U.S. Cl. ........................ 369/126; 369/100; 250/306; 250/307
[58] Field of Search ...................... 369/100, 101, 369/126; 250/306, 307

[56] References Cited

U.S. PATENT DOCUMENTS

| 2,931,691 | 4/1960 | Curtis et al. | 346/74 |
| 3,562,760 | 2/1971 | Cushner et al. | 346/74 |
| 3,611,421 | 10/1971 | Benoit | 346/74 |
| 3,778,785 | 12/1973 | von Gutfeld | 340/173 |
| 4,264,986 | 4/1981 | Willis | 365/124 |

(List continued on next page.)

FOREIGN PATENT DOCUMENTS

| 0 184 189 | 6/1986 | European Pat. Off. . |
| 0 186 911 | 7/1986 | European Pat. Off. . |
| 0 335 487 | 10/1989 | European Pat. Off. . |
| 0 390 470 | 10/1990 | European Pat. Off. . |
| 0 445 825 | 9/1991 | European Pat. Off. . |
| 0 568 753 | 11/1993 | European Pat. Off. . |
| 1 199 907 | 12/1959 | France . |

(List continued on next page.)

OTHER PUBLICATIONS

European Search Report dated Oct. 2, 1996.

S. Hoen et al. "Thermomechanical data storage using a fiber optic stylus", *Applied Physics Letters*.vol. 64, No. 3, Woodbury, NY, Jan. 17, 1994.

"High Density Magnetic Storage Using an Atomic Force Microscope with Optical Detection", *IBM Technical Disclosure Bulletin*, vol. 34, No. 7B, Armonk, NY, Dec. 1991.

Sato, A. and Y. Tsukamoto, "Nonometre–scale recording and erasing with the scanning tunnelling microscope", *Nature*, vol. 363, pp. 431–432, Jun. 3, 1993.

(List continued on next page.)

*Primary Examiner*—Tod R. Swann
*Assistant Examiner*—Kim-Kwok Chu
*Attorney, Agent, or Firm*—Morrison & Foerster

[57] ABSTRACT

An information recording and reproducing device includes an inorganic recording medium having at least one material selected from the group consisting of a phase change material, a shape changing material and a magnetic material. A conductive probe, which is proximate to or contacting a recording surface of the recording medium, is movable relative to the recording medium. Information is recorded by heating the recording medium in the area where the conductive probe is proximate or contacting to change a physical state therein. The area of the recording medium where the conductive probe is proximate or contacting is heated by applying voltage between the conductive probe and the recording medium.

23 Claims, 12 Drawing Sheets

U.S. PATENT DOCUMENTS

| | | |
|---|---|---|
| 4,773,060 | 9/1988 | Shimada et al. ............... 369/100 |
| 4,896,044 | 1/1990 | Li et al. ............... 250/492.3 |
| 5,216,631 | 6/1993 | Sliwa, Jr. ............... 365/174 |
| 5,272,667 | 12/1993 | Yamada et al. ............... 365/113 |
| 5,331,589 | 7/1994 | Gambino et al. ............... 365/151 |
| 5,389,475 | 2/1995 | Yanagisawa et al. ............... 369/126 |
| 5,479,024 | 12/1995 | Hillner et al. ............... 250/458.1 |

FOREIGN PATENT DOCUMENTS

| | | |
|---|---|---|
| 57-113406 | 7/1982 | Japan . |
| 60-212843 | 10/1985 | Japan . |
| 62-239418 | 10/1987 | Japan . |
| 3-165348 | 7/1991 | Japan . |
| 3-230342 | 10/1991 | Japan . |
| 5-40968 | 2/1993 | Japan . |
| 2 157 876 | 10/1985 | United Kingdom . |
| WO-A-88 04470 | 6/1988 | WIPO . |

OTHER PUBLICATIONS

Bösch, M.A., "Optical recording in hydrogenated semiconductors", *Applied Physics Letters,* vol. 40, No. 1, p. 439, Mar. 25, 1986.

Patent Abstract of Japan of JP–A–1 182905, vol. 13, No. 467, p. 948, Oct. 23, 1989.

Patent Abstracts of Japan, JP–A–2 37501, vol. 14, No. 191, p. 1038, Apr. 18, 1990.

European Search Report of corresponding patent application EP 95 10 1231 dated Oct. 24, 1995.

Mamin, H.J. and D. Rugar, "Thermomechanical writing with an atomic force microscope tip", *Applied Physics Letters,* vol. 61, No. 24, pp. 1003–1005, Aug. 24, 1992.

HIGH DENSITY RECORDING BY A CONDUCTIVE PROBE CONTACT WITH PHASE CHANGE RECORDING LAYER

This application is a continuation of U.S. application Ser. No. 08/377,364, filed Jan. 24, 1995, now abandoned.

BACKGROUND OF THE INVENTION

1. Field of the Invention

The present invention relates to information recording and reproducing devices and methods which can be obtained with applied scanning probe microscope (hereinafter abbreviated SPM) technologies.

2. Description of the Related Art

In recent years, super high density recording methods obtained with applied SPM technologies including scanning tunnel microscopes (hereinafter abbreviated STM) or atomic force microscopes (hereinafter abbreviated AFM) have been proposed. There are many known methods to change the contour of the surface of the recording medium or to change physical properties of the surface of the recording medium by SPM, such as the mechanical processing method of pressing a probe to the recording medium directly, the electrical field evaporation method of depositing probe material onto the surface of the recording medium or eliminating a material from the surface of the recording medium by generating a strong electric field between the probe and the substrate. Any of these recording methods may achieve a super high recording density of greater than 1 Tbit/inch$^2$.

In general, such conventional information recording and reproducing technologies have shortcomings in terms of processing stability. For example, when the electrical field evaporation method is used, a comparatively high voltage should be applied between the probe and the recording medium to generate the electric field necessary to change the surface state of the recording medium or the probe. However, when a high voltage is applied between the probe and the recording medium, it is possible that the tip of the probe will be deformed or the probe may break when recording information on the recording medium. For that reason, a stable information recording is not accomplished by these methods.

A method to solve the above-mentioned problem of the electrical field evaporation method is proposed in the article of "Appl. Phys. Lett., Vol. 61, No. 8, Aug. 24, 1992, pp. 1003–1005". The method is to change the shape of PMMA surface by heating a probe which contacts the recording medium by a laser beam. Since this method uses thermal energy from the probe to record information on the recording medium, it is not necessary to apply voltage between the probe and the recording medium and it is possible to extend the life of the probe. However, in this method, the information recording speed is rate-determined by the probe's heating speed and cooling speed and is limited to about 100 kHz.

SUMMARY OF THE INVENTION

To solve the above-mentioned problems of the prior art, the present invention provides an information recording and reproducing device and an information recording and reproducing method which applies SPM technologies. It provides a super high density recording of over 1 Tbit/inch$^2$ level with high recording stability and high accuracy reproduction at high speed.

In a first embodiment of the information recording and reproducing device of the present invention, there is a recording medium, a conductive probe which contacts the surface of the recording medium and is movable relative to the recording medium, and a voltage-applying means to apply voltage between the conductive probe and the recording medium, and records information on the recording medium by contacting the conductive probe onto the surface of the recording medium, applying voltage between the conductive probe and the recording medium by the voltage applying means at the time of recording to heat the area of the recording medium contacting the conductive probe and change the state in the area.

In the above-mentioned embodiment, it is preferable to reproduce the information by the conductive probe contacting the surface of the recording medium.

It is also preferable to reproduce the information by measuring the electric conductivity of the recording medium using the conductive probe contacting the surface of the recording medium.

It is further preferable to include a current detecting means to detect the current flowing in the portion between the conductive probe and the recording medium, reproduce the information by measuring the electric conductivity of the recording medium apply voltage by the voltage applying means between the conductive probe contacting the surface of the recording medium and the recording medium, and detect the flowing current.

It is also preferable to reproduce information by measuring the surface contour of the recording medium using the conductive probe contacting the surface of the recording medium.

It is further preferable to reproduce the information by measuring the contour of the recording medium by including a position detecting means for detecting the position of the conductive probe contacting the recording medium.

It is also preferable to reproduce information by measuring the magnetization direction of the recording medium using the conductive probe proximate to or contacting the surface of the recording medium.

It is further preferable to include a magnetic force detecting means for reproducing information by measuring the magnetization direction of the recording medium to detect the magnetic force between the conductive probe and the recording medium and detecting the magnetic force between the conductive probe proximate or contacting the surface of the recording medium.

It is also preferable that the conductive probe is located at the tip of a cantilever.

It is further preferable that the recording medium is located on a plane parallel to a central axis of a body of rotation comprising a cylinder-like or a column-like shape rotating around the central axis, and the surface of the recording medium is used as the recording plane.

It is also preferable that the direction of the line connecting the fixed end and the free end of the cantilever is nearly orthogonal to the direction of the central axis of the body of rotation.

It is further preferable that the coefficient of thermal expansion of the material comprising the body of rotation at a room temperature is less than $3 \times 10^{-6}$/° C.

It is also preferable that at least the atmosphere surrounding the recording plane is a non-oxidizing atmosphere.

In a second embodiment, the information recording and reproducing device of the present invention comprises a recording medium, a conductive probe which is proximate to or in contact with the surface of the recording medium and movable relatively to the recording medium, a recording medium heating means to heat a distinctive area of the recording medium to a certain temperature, and a voltage-applying means to apply voltage between the conductive probe and the recording medium, and records the information on the recording medium by getting the probe proximate to or in contact with the surface of the recording medium, applying voltage between the probe and the recording medium by the voltage applying means with the area of the recording medium where the probe is proximate to or in contact with heat applied by the heat applying means to further heat the area of the recording medium heated in part and change the state of the part of the area.

In the above-mentioned structure, it is preferable to irradiate a light to heat an area of the recording medium to which the probe is proximate or in contact with.

It is also preferable to have a laser element and an optical system to concentrate a laser beam on the recording medium.

It is further preferable to heat an area of the recording medium by means of a heated probe proximate to or in contact with the area.

It is also preferable to irradiate a light to heat the probe.

It is further preferable to have a laser element and an optical system to concentrate a laser beam on the probe.

It is also preferable to have a heater in the vicinity of the probe to heat the probe.

In a third embodiment, the information recording and reproducing device of the present invention comprises a recording medium, a conductive probe which is movable relative to the recording medium, and a probe heating means to heat the tip of the probe to a certain temperature, and records the information on the recording medium by getting the probe proximate to or in contact with the surface of the recording medium and heating the tip of the probe by the probe heating means at the time of recording, heating the area of the recording medium where the probe is proximate to or in contact with and change the state of the part of the area.

In a fourth embodiment, the information recording and reproducing device of the present invention comprises a recording medium, a conductive probe which is movable relative to the recording medium, and a probe heating means to heat the tip of the probe to a certain temperature, and records the information on the recording medium by constantly heating the probe during the operation by the probe heating means, getting the probe proximate to or in contact with the recording medium at the time of recording though the other time the probe and the recording means are apart, heating the area of the recording medium where the probe is proximate to or in contact with and change the state of the part of the area.

In the third or fourth embodiment of the present invention, it is preferable to heat the probe by irradiating a light onto the probe.

It is also preferable to have a laser element and an optical system to concentrate a laser beam on the probe.

It is further preferable to have a heater in the vicinity of the probe and to heat the probe by the heater.

It is also preferable to reproduce the information by means of the probe proximate to or in contact with the surface of the recording medium.

It is further preferable to reproduce the information by measuring the conductivity of the recording medium by means of the probe proximate to or in contact with the surface of the recording medium.

It is also preferable to include a voltage applying means to apply voltage between the probe and the recording medium, and a current detecting means to detect the current between the probe and the recording medium, and reproduce the information by applying voltage between the probe proximate to or in contact with the surface of the recording medium by the voltage applying means detecting the flowing current by the current detecting means and measuring the conductivity of the recording medium.

It is also preferable to reproduce the information by means of the probe proximate to or in contact with the surface of the recording medium to measure the contour of the surface of the recording medium.

It is further preferable to include a position detecting means to detect the position of the probe and reproduce the information by measuring the contour of the recording medium by detecting the position of the probe contacting the surface of the recording medium.

It is also preferable to reproduce the information by measuring the direction of the magnetization using the probe proximate to or contacting the surface of the recording medium.

It is further preferable to include a magnetic force detecting means to detect the magnetic force between the probe and the recording medium, and reproduce the information by measuring the magnetization direction between the probe proximate or contacting the surface of the recording medium and the recording medium.

It is also preferable to have the probe at the tip of the cantilever.

It is further preferable to have the recording medium at a plane of a cylinder-type or a column-type body of rotation parallel to the center axis thereof and to have the recording surface on the surface of the recording medium.

It is also preferable that the direction of the line connecting the fixed end and the free end of the cantilever is orthogonal to the direction of the center axis of the body of rotation.

It is further preferable that the material of the body of rotation at a room temperature has a coefficient of the thermal expansion of $3 \times 10^{-6}/°$ C. or less.

It is also preferable that at least the atmosphere surrounding the recording surface is a non-oxidizing atmosphere.

In all of the above-mentioned embodiments, it is preferable that the recording medium comprises a phase changing material and the state change is the one from the first phase to the second phase.

It is also preferable that the phase changing material is at least one selected from the group consisting of Ge, Sb, Te, Sn, Ga, Se, Pb, Bi, and In.

It is further preferable that the recording medium is one selected from the group consisting of a thermoplastic material, a metal or an alloy of Cu, Ag, Au, Zn, Cd, Ga, In, Eu, Gd, Ti, Ge, Pb, Sb, Bi, Te, an oxide material, and a carbon material and change of the state of the surface shape change.

It is also preferable that the recording medium comprises a magnetic material and the state change is the change in the magnetization direction.

It is further preferable that the magnetic material comprises at least one from the group consisting of amorphous magnetic materials of GdCo, GdFe, TbFe, DyFe, GdFeBi, GdTbFe, GdFeCo, GeTbFeCo, GdTbFeCo, polycrystalline magnetic materials of MnBi, MnCuBi, MnAlGe, PtCo, $CrO_2$, CoCr, EuO, PtMnSb, HfTaFe, $CoCrFeO_4$, BiAlGdIG, BiGaYIG, and monocrystalline magnetic materials of GdIG, BiSmErGaIG.

In a fifth embodiment, the information recording and reproducing device of the present invention records the information on the recording medium or reproduces the information recorded on the recording medium by having a cantilever to the direction parallel to the recording surface of the recording medium, having a probe equipped at the tip of the cantilever to the direction perpendicular to the recording surface located relatively proximate or contacting the recording surface, having the recording medium at the plane parallel to the center axis of a cylinder or column and having the recording surface at the surface of the recording medium.

In this embodiment, it is preferable to include a means to detect the displacement of the cantilever and a means to move the probe in the direction perpendicular to the recording surface and in the direction of the center axis of the body of rotation.

It is also preferable that the direction of the line connecting the fixed end and the free end of the cantilever is located orthogonal to the center axis of the body of rotation.

It is further preferable that the material comprising the body of rotation has a coefficient thermal expansion at a room temperature of $3 \times 10^{-6}/°$ C. or less.

It is also preferable that at least the atmosphere surrounding the recording surface is a non-oxidizing atmosphere.

EFFECT OF THE INVENTION

Since an embodiment of the device of the present invention comprises, an inorganic recording medium comprising at least one material selected from the group consisting of a phase changing material, a shape changing material and a magnetic material, and a conductive probe proximate to or contacting the surface of the recording medium and movable comparatively to the recording medium, and information is recorded by heating the recording medium in the area where the conductive probe is proximate or contacting to change the state therein, an information recording and reproducing device which can easily record the information on the recording medium by changing the phase state (for example, the crystalline state and the amorphous state), the surface state (concave and convex), or magnetization direction of the recording medium can be realized. In this case, information densification can be accomplished by using a probe having a tip of a small adius of curvature.

In an embodiment of the device of the present invention further comprising a recording medium heating means to previously heat the recording medium to a certain temperature, the following effect can be expected. That is, for example, when information is to be recorded on the recording medium in the crystalline state in the first condition (the state wherein no information is recorded), by heating the recording medium previously to a temperature over the crystallization point by means of the recording medium heating means, all the information previously recorded can be erased. As a result, the overwriting operation which records a new information while erasing a previouly-recorded information can be enabled. For example, when the means to heat the area of the recording medium where the conductive probe is proximate or contacting is a voltage applying means to apply voltage between the conductive probe and the recording medium, recording information can be achieved by changing the surface state of the recording medium by pre-heating the surface of the recording medium of which state is to be changed by the resistance heat of the current from the probe to a temperature not sufficient to change the state with a recording medium heating means (for example, a laser beam or a heater) and then superimposing a thermal energy of a comparatively small current. Consequently, it is possible to curb the voltage applied between the probe and the recording medium at the time of recording at a low level to shorten the writing time and extend the life of the probe.

In another example of the device of the present invention in which the means to heat the area of the recording medium where the conductive probe is proximate or contacting is a voltage applying means to apply voltage between the conductive probe and the recording medium, since the heat source can be equipped externally, the circumference structure of the conductive probe and the recording medium is not complicated.

In another example of the device of the present invention that the means to heat the area of the recording medium where the conductive probe is proximate or contacting is a light irradiating device to irradiate a light in a certain area of the recording medium where the conductive probe is proximate or contacting, since the area of the recording medium can be heated without contacting, the heating structure can be simplified.

In another embodiment of the device of the present invention that the means to heat the area of the recording medium where the conductive probe is proximate or contacting is a heated conductive probe, since the heat application to the recording medium can be terminated by aparting the probe from the recording medium without rate limiting the recording speed by the heating time or the cooling time of the probe, the recording speed can be accelerated. Further, unlike the case information is recorded utilizing the Joule heating of the current flowing between the probe and the recording medium, since this embodiment does not require applying voltage between the probe and the recording medium, the life of the probe can be extended and information can be recorded stably for a long time. Moreover, if the above-mentioned heater located in the vicinity of the conductive probe is used as the means to heat the conductive probe, the heating time can be shortened.

In another embodiment of the device of the present invention that the state change of the phase change material is from the first phase to the second phase, since the state of the phase changing material changes stably from the first phase to the second phase by heat, information can be recorded stably. In this case, in another embodiment in which information is recorded by heating a certain area of the recording medium comprising a phase change material in the amorphous state in the initial condition for a time longer than the crystallization time at a temperature higher than the crystallization point but lower than the melting point of the phase change material to change the phase of the certain area from the amorphous state to the crystalline state, since the area to record the information comprises the crystalline phase, information can be stored stably for a long time. In another embodiment in which information is recorded by heating a certain area of the recording medium comprising a phase change material in the crystalline state in the initial condition at a temperature higher than the melting point of the phase changing material to change the phase of the certain area from the crystalline state to the amorphous state, since the area to record the information comprises the amorphous state, unlike the case of the crystalline state, it is unnecessary to have the crystallization time to shorten the recording time, that is, the information recording can be accelerated.

In another embodiment of the device of the present invention in which the phase change material comprises at least one material selected from the group consisting of Ge, Sb, Te, Sn, Ga, Se, Pb, Bi and In, a high speed phase change can be conducted stably to accelerate the information recording reliably. In this case, in another embodiment that the atmosphere surrounding the phase change material at the time of heating the phase change material is non-oxidized atmosphere, since the deterioration of the recording medium or the probe can be prevented as well as the stability to the temperature change can be enhanced, the device can operate stably for a long time.

In another embodiment of the device of the present invention that the state change of the recording medium comprising a magnetic material is the change of the magnetization direction, since the recording medium comprises a magnetic material, by heating the recording medium to a temperature higher than the Curie point, information can be recorded by changing the magnetization direction. In this case, in another embodiment further comprising a magnetic field generator to apply a magnetic field to the recording medium, since the magnetization direction of the recording medium can be securely changed by applying the magnetic field to the area of the recording medium to record the information, an information recording and reproducing device which allows recording or reproducing with high SN ratio can be achieved.

In another embodiment of the device of the present invention that the shape changing material comprises one selected from the group consisting of thermoplastic materials, metals of Cu, Ag, Au, Zn, Cd, Ga, In, Eu, Gd, Ti, Ge, Pb, Sb, Bi, Te, alloys combining a plural of the metals, oxide materials and carbonate materials, surface shape change such as perforation of the recording medium can be made by heating the surface of the recording medium to cause melting, evaporation or sublimation of the shape changing material, thus recording information on the recording medium can be facilitated. Moreover, since such thermoplastic materials, metals or alloys, oxide materials and carbonate materials are inexpensive, the recording medium can be provided at a low cost.

In a preferable embodiment of the device of the present invention that the conductive probe is located at the free end of a cantilever, since the shock of the bump of the probe to the projected part of the surface of the recording medium can be absorbed by deflection of the cantilever to prevent imposing considerable force on the probe, the probe or the recording medium will not be damaged. Accordingly, unlike scanning tunnel microscopes (STM) controlling the position of the probe constantly corresponding to the fine projection and dent of the surface of the recording medium to prevent the bump of the probe and the projection of the surface of the recording medium, information can be reproduced at a high speed. In this case, in another embodiment in which the conductive probe and the cantilever are formed integratedly and the conductive probe comprises the tip of the free end of the cantilever bent approximately at the right angle, when the recording medium comprises a magnetic material, by forming the conductive probe and the cantilever with a metal thin film a means to generate the magnetic field can be equipped at the rear side of the cantilever. In this case, in another embodiment that at least the tip of the conductive probe comprises a magnetic material of a large magnetic permeability, since the external magnetic field or the magnetic field formed by the area of the recording medium surrounding the fine area to record the information can be concentrated to the tip of the probe when the recording medium comprises a magnetic material, information can be recorded securely as well as an information recording and reproducing device having a small bit area enabling high densification can be provided. In another embodiment comprising a means to detect the displacement of the cantilever at the time the conductive probe is located proximate or contacting to the surface of the recording medium, an information recording and reproducing device which reproduces the information recorded by changing the shape of the surface of the recording medium with the same probe used in the recording can be provided. In this case, in another embodiment that the conductive probe comprises a magnetic material, the change of the magnetization direction can be reproduced with the same probe used in the recording.

In another embodiment of the device of the present invention that the recording medium is located on the rounded surface of a body of rotation comprising cyrindrical shape or column shape rotating around a certain center axis and the surface of the recording medium comprises the recording surface, the displacement of the recording surface to the direction perpendicular to the center axis at the time of rotating the recording medium can be curbed. Consequently, tracking control can be conducted accurately at a high speed. In this case, in another embodiment that the conductive probe is located at the free end of the cantilever, and further comprising a means to detect the displacement of the cantilever and a means to move the conductive probe comparatively to the direction perpendicular to the recording surface and to the direction parallel to the center axis of the body of rotation, the information recorded on the recording surface can be detected as the change of the fine structure of the recording surface to be read. In this case, in another embodiment that the conductive probe is located at the free end of the cantilever, and the direction of the line connecting the fixed end and the free end of the cantilever is orthogonal to the direction of the direction of the center axis of the body of rotation, errors at the time of recording or reproducing information can be reduced. In another preferable embodiment that the material of the body of rotation at a room temperature has a coefficient of the thermal expansion of $3 \times 10^{-6}/°$ C. or smaller, since the effect of the body of rotation to the temperature can be drastically reduced, tracking stability can be enhanced.

In another embodiment of the device of the present invention in which the recorded information is reproduced by means of the conductive probe proximate or contacting to the surface of the recording medium, since the same probe used in the information recording can be used, the structure around the recording medium can be simplified. In this case, in another embodiment information is reproduced by measuring the conductivity of the recording medium, since phase change materials such as $GbSb_2Te_4$ has different conductivity in the crystalline state and the amorphous state, when the recording medium comprises a phase changing material, information can be reproduced securely distinguishing the recorded state and the unrecorded state. In another embodiment that the means to measure the conductivity of the recording medium comprises, a voltage applying device to apply voltage between the conductive probe and the recording medium, and a current detecting device to detect the current flowing between the conductive probe and the recording medium, and the conductivity of the recording medium is measured by applying voltage between the conductive probe contacting the surface of the recording medium by means of the voltage applying device and by detecting the current flowing between the conductive probe and the recording medium by means of the current detecting device, since the phase state of the recording medium (the crystalline state of the amorphous state) can be distinguished by detecting the current flowing between the conductive probe and the recording medium, the recorded information can be reproduced reasily. Further, in another embodiment that a certain voltage to be applied between the conductive probe and the recording medium generates a current flowing between the conductive probe and the recording medium to heat the conductive probe and the recording medium at a temperature lower than the point to change the state of the recording medium, since the state of the recording medium does not change even when the probe is proximate or contacting to the recording medium, information can be reproduced stably. In another embodiment that information is reproduced by measuring the surface contour of the recording medium, since of phase change materials such as $GbSb_2Te_4$ has different shape in the crystalline state and the amorphous state, when the recording medium comprises a phase change material, information can be reproduced stably distinguishing the recorded state of the unrecorded state. In another embodiment that the means to measure the surface contour of the recording medium comprises a position detecting device to detect the position of the conductive probe, and the surface contour of the recording medium is measured by detecting the position of the conductive probe contacting to the surface of the recoding medium by means of the position detecting device, since the phase state of the recording medium (the crystalline state or the amorphous state) can be distinguished by detecting the position of the conductive probe, the recorded information can be reproduced easily. In another embodiment that information is reproduced by detecting the change of the force between the conductive probe and the recording medium, since in the recording medium the area of which state is changed and the area of which state is not changed have different physical values such as attracting force or repulsive force between the tip of the probe and the surface of the recording medium, information can be reproduced by distinguishing the area of which surface contour is changed and the area of which surface contour is not changed of the recording medium. In this case, in another embodiment that the conductive probe is located at the free end of the cantilever, and the change of the force between the conductive probe and the recording medium is conducted by detecting the deflection of the cantilever, by measuring the amount of the cantilever's deflection by such means as the optical lever method irradiating a laser beam to the rear side of the cantilever and detecting the reflected beam from the cantilever by a half-split photodiode, the force between the probe and the recording medium can be detected. In this case, in another embodiment that information is reproduced by measuring the magnetization direction of the recording medium, since magnetic materials such as Tb—Fe—Co have different magnetization direction in the recorded state and the unrecorded state, when the recording medium comprises a magnetic material, information can be reproduced securely by distinguishing the recorded state and the unrecorded state. In another embodiment that the means to measure the magnetization direction of the recording medium comprises a magnetic force detecting device to detect the magnetic force between the conductive probe and the recording medium, and magnetization direction of the recording medium is measured by detecting the magnetic force between the conductive probe proximate or contacting to the surface of the recording medium and the recording medium by means of the magnetic force detecting device, since the state of the recording medium (difference of the magnetization direction) can be distinguished by detecting the magnetic force between the probe and the recording medium, the recorded information can be readily reproduced.

In another embodiment of the device of the present invention comprising a means to irradiate a laser beam to the surface of the recording medium, and a means to detect the laser beam, since phase change materials such as $GbSb_2Te_4$ has different refractive index in the crystalline state and the amorphous state and thus the crystalline state and the amorphous state can be distinguished by irradiating a laser beam to the surface of the recording medium and detecting the reflected beam, the recorded information can be easily reproduced.

In another embodiment of the device of the present invention that information is erased by changing the state of the recorded portion by applying heat to the recorded portion of the recording medium at the point the conductive probe is proximate or contacting, by changing the phase state (for example, the crystalline state and the amorphous state) or the magnetization direction of the recording medium, the information recorded on the recording medium can be easily erased.

Since an embodiment of the method of the present invention comprises locating a conductive probe proximate or contacting to an inorganic recording medium comprising at least one selected from the group consisting of a phase change material, a shape changing material and a magnetic material, heating a certain area of the recording medium to which the conductive probe is proximate or contacting to record information on the recording medium by changing the state of the area of the recording medium to which the conductive probe is proximate or contacting, information can be easily recorded on the recording medium by changing the phase state (for example, the crystalline state and the amorphous state), the surface contour (convex and concave), or the magnetization direction fo the recording medium.

Since an embodiment of the method of the present invention comprises applying heat to the recording medium previously to a certain temperature, further applying heat to a certain area of the recording medium to which the conductive probe is proximate or contacting to record information on the recording medium by changing the state of the area of the recording medium to which the conductive probe is proximate or contacting, when the area of the recording medium to which the conductive probe is proximate or contacting is heated by applying voltage between the probe and the recording medium, information can be recorded by previously heating the area of the recording medium of which state is to be changed by the resistance heat from the probe to a temperature lower than the point to cause the state change by another means such as a laser beam or a heater, and further by superimposing a thermal energy generated by a comparatively small voltage to change the state of the surface of the recording medium. Consequently, since the voltage to apply between the probe and the recording medium at the time of recording can be curbed, the recording time can be shortened as well as the life of the probe can be extended.

In another embodiment of the method of the present invention comprising constantly contacting the conductive probe to the surface of the recording medium, applying heat to the conductive probe for a certain time to a certain temperature when the conductive probe reaches to the point above a certain recording position of the recording medium, heat to the recording medium by the heat conduction or irradiated heat from the probe can be prevented. For example, in an embodiment in which information is recorded by using the recording medium comprising a phase changing material, and changing the phase from the amorhpous state to the crystalline state, misrecording of the information caused bu the heat conduction or the irradiated heat from the probe at the time of the information recording can be prevented.

In another embodiment of the method of the present invention comprising constantly heating the conductive probe during the recording operation, keeping the conductive probe apart from the recording medium and putting the conductive probe proximate or contacting to the surface of the recording medium at the time of recording, information can be recorded by putting the probe previously heated to a certain temperature proximate or contacting to the surface of the recording medium, then heating can be terminated by departing the probe from the surface of the recording medium after finishing the information recording. Therefore, the recording speed does not be rate limited by the heating time or the cooling time, and high speed recording can be enabled.

DETAILED DESCRIPTION OF THE INVENTION

This invention will be further described in more detail with reference to the figures.

Figure 1:
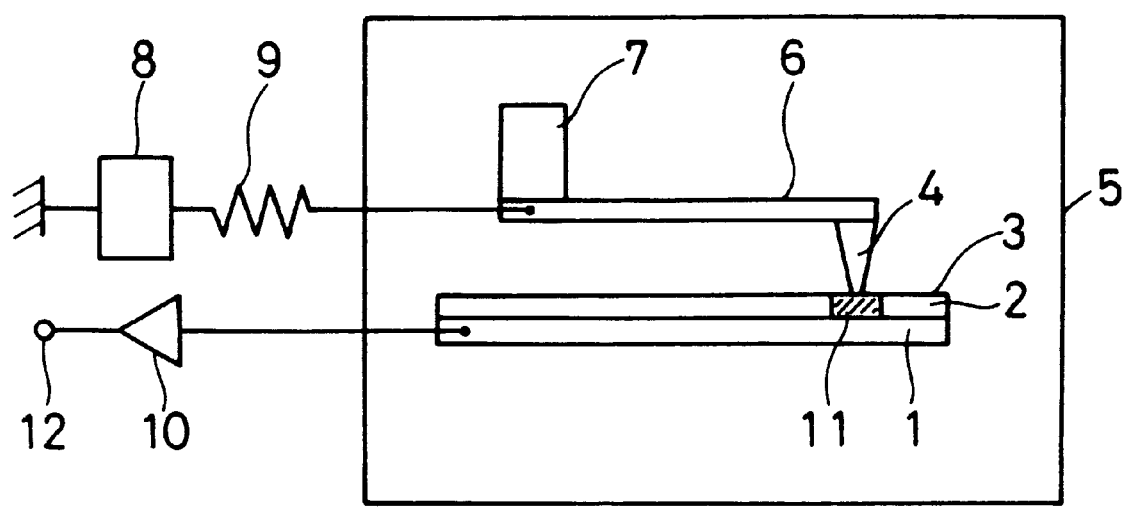
FIG. 1 illustrates a first embodiment of the Example 1 of the information recording and reproducing device of the present invention.

FIG. 1 illustrates a structure of the information recording and reproducing device of the present invention. As shown in FIG. 1, a conductive substrate 1 comprising a platinum thin film of 100 nm thickness having a phase change material, a $GeSb_2Te_4$ thin film 2 of 20 nm thickness in the amorphous state formed thereon is used as the recording medium 3.

The conductive probe 4 is located opposite to the recording medium 3, and at the tip of the cantilever 6 comprised of an SiN thin film and formed integrally therewith. By this structure, a possible shock caused by a bump against the surface of the recording medium 3 during recording or reproducing can be prevented. The surface of cantilever 6 and the conductive probe 4 are applied with a Cr thin film of 30 nm thickness followed by an Au thin film of 70 nm thickness by deposition to stabilize conductivity. The conductive probe 4 is placed in contact with the surface of the recording medium 3. To prevent surface oxidation, the recording medium 3 is located in a box 5 filled with nitrogen.

The cantilever 6 is attached to the actuator 7 which can move accurately in the X, Y, and Z directions. By this structure, the conductive probe 4 can move along the surface of the recording medium 3 with an accuracy of 0.1 nm or smaller. The conductive probe 4 is connected to the power supply 8 to apply voltage between the conductive probe 4 and the recording medium 3 via the protection resistance 9 of 20 M ohm. The current flowing between the conductive probe 4 and the recording medium 3 is detected by the output terminal 12 via the current amplifier 10 connected to the recording medium 3.

The recording operation will now be described in view of FIG. 1 and FIG. 2.

Figure 2:
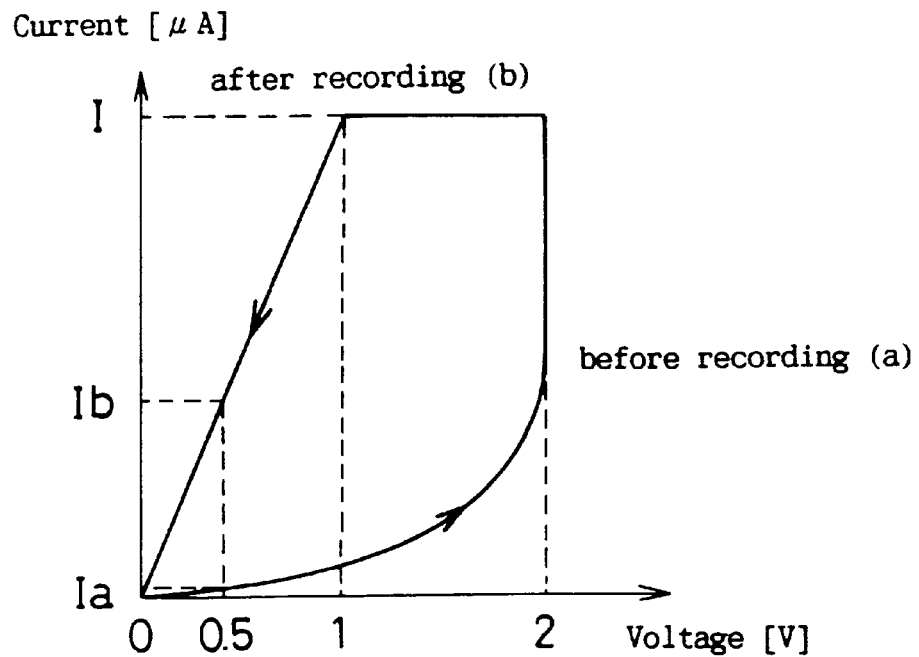
FIG. 2 is a graph describing voltage-current characteristics of the first embodiment of the present invention at the time of recording in the nitrogen atmosphere.

FIG. 2 describes the current value when a voltage of 0 V to 2 V is applied between the conductive probe 4 and the recording medium 3, that is, voltage-current characteristics.

As shown in FIG. 2, the phase change material $GeSb_2Te_4$ exhibits high resistance in the amorphous state (a) before recording information, and exhibits low resistance in the crystalline state (b) after recording information.

The conductive probe 4 moves to the in-place direction at the speed of 2 mm/sec, keeping contact with the surface of the recording medium 3 by means of actuator 7. When the conductive probe 4 reaches the position to be recorded, a pulsed voltage of 2 V for 10 μsec is applied between the recording medium 3 and the conductive probe 4 by the power supply 8. The record portion or contact portion 11 of the recording medium 3 contacting the conductive probe 4 is heated for 10 μsec to approximately 200° C. by the resistance heat of the current flowing between the conductive probe 4 and the recording medium 3, and thereby changes from amorphous state to crystalline state to record the information.

The crystallization speed of a phase changing material depends upon heating temperature. For example, if $GeSb_2Te_4$ is used as the phase change material, by increasing the voltage applied to heat the surface of the recording medium 3 to about 400° C. by resistance heat, the recording time can be reduced to approximately 100 n sec.

Next the reproducing operation of the recorded information will be described.

Since phase change materials such as $GeSb_2Te_4$ have different conductivities in the crystalline state and the amorphous state, by using the conductivity change, reading the recorded information can be disabled. As shown in FIG. 1, the conductive probe 4 is located on the surface of the recording medium 3 to apply voltage to the conductive probe 4 and the recording medium by the power supply 8. Then with the conductive probe 4 moving along the surface of the recording medium 3 by the actuator 7, the current is detected by the output terminal 12 via the current amplifier 10. Since the crystalline state and the amorphous state can be distinguished by this, recorded information can be read. For $GeSb_2Te_4$, information reproduction is conducted by applying a voltage that increases a temperature at the surface of the recording medium 3 by resistance heat of the flowing current to less than 100° C., such as 0.5 V. However, it is on condition that the current at reproduction is within the range that the resistance heat created by the current does not change the phase of the recording medium 3.

As shown in FIG. 2, since the current value will be Ib at the crystalline phase and Ia at the amorphous phase when the applied voltage is 0.5 V, information can be reproduced by detecting the current value at the area the conductive probe 4 is positioned and distinguishing whether the data bit is in the amorphous phase or the crystalline phase.

The size of the record portion 11 reproduced by this method is a circle having diameter of approximately 20 nm. A record bit having this size can record the information of about 1 Tbit/in$^2$. Further, the size of the record bit depends upon the size of the area to be heated, in particular, the size of the area where the conductive probe 4 and the recording medium 3 are in contact. Therefore, using a probe having a tip of a small radius of curvature enables further densification.

Although information reproduction is conducted by detecting the conductivity difference in the crystalline state and the amorphous state in this embodiment, the reproduction method is not so limited. It is also possible to reproduce the information, for example, by detecting the contour change resulting from a phase change. Regarding $GeSb_2Te_4$, the phase change from the amorphous phase to the crystalline phase causes a volume increase of a few percent. Detecting such a volume increase, like conventional cases using AFM technologies, can be conducted by detecting the displacement of the cantilever 6. For example, it is useful to use an optical lever method which irradiates a laser beam to the rear side of the cantilever 6 and detects the reflected beam by a half-split photodiode.

Further, although this embodiment uses GeSbTe as the phase changing material, it is not so limited. Rather any material comprising at least one selected from the group consisting of Ge, Sb, Te, Sn, Ga, Se, Pb, Bi and In can be used as well. For example, chemical compounds which can achieve high-speed, stable phase change such as GeTe, GeTeSn, SbTe, SnTe, PbTe, SbSe, BiSe, GeSe, and InSbTe can be used.

Since the metal film of the conductive probe 4 may peel off when the applied voltage at recording is 6 V or higher, it is preferable to keep the applied voltage in the range of 2 V to 6 V.

Although this embodiment uses a nitrogen atmosphere to prevent oxidation, it is not so limited. Similar results can be obtained by conducting the procedure in a liquid inert to the recording medium 3 and the conductive probe 4 such as silicon oil.

Figure 3:
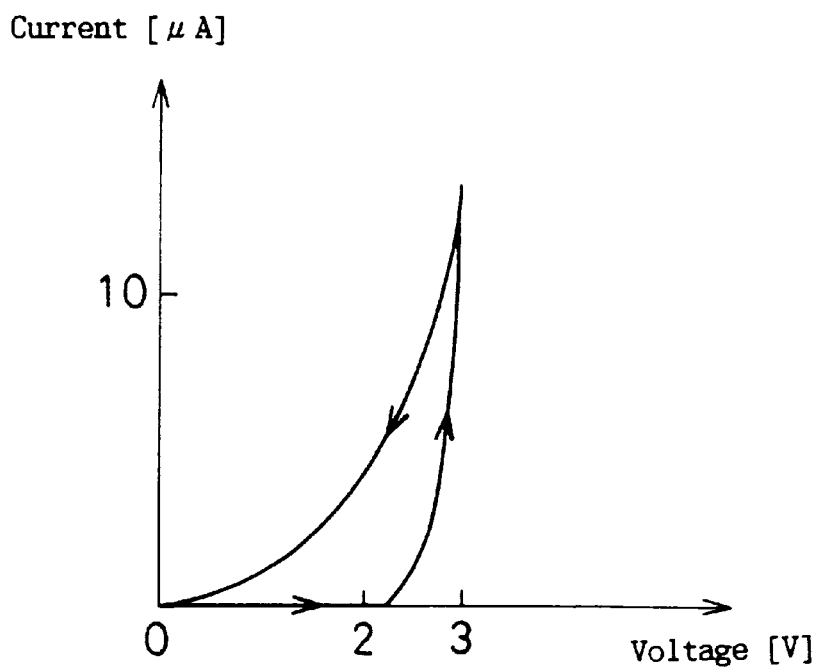
FIG. 3 is a graph describing voltage-current characteristics of the first embodiment of the present invention at the time of recording in the atmosphere.

FIG. 3 illustrates the current value when a voltage of 0 V to 3 V is applied to the conductive probe 4 and the recording medium 3 in the air, that is voltage-current characteristic. The recording medium 3 exhibits an insulating property of 10 M Ω or larger in the air when the applied voltage is about 2 V or smaller. When a voltage larger than 2 V is applied, the conductivity drastically improves and even if the voltage decreases to smaller than 2 V afterwards, the surface of the recording medium 3 does not display insulating properties, rather the current continues to flow.

Methods to erase the recorded information will be explained with reference to FIG. 1, FIG. 4, and FIG. 5.

In general, the phase change material is heated to a temperature higher than the crystallization point, but lower than the melting point to change from the amorphous state to the crystalline state. The phase change material is heated to a temperature higher than the melting point to change from the crystalline state to the amorphous state. A phase change material such as $GeTe_2Sb_4$ changes from the crystalline phase to the amorphous phase reversally. Accordingly, to erase the record portion 11 recorded in the crystalline state, the record portion 11 needs to be heated to the melting point followed by quenching to change to the amorphous phase. By this process, the recorded information can be erased. Since the melting point of a $GeSb_2Te_4$ thin film 2 is about 600° C., and if the record portion 11 of the recording medium 3 is heated to that temperature by resistance heat by applying voltage to the conductive probe 4 and the recording medium 3 to change the $GeSb_2Te_4$ thin film 2 to the amorphous state, the data bit recorded in the crystalline state can be erased.

Figure 4:
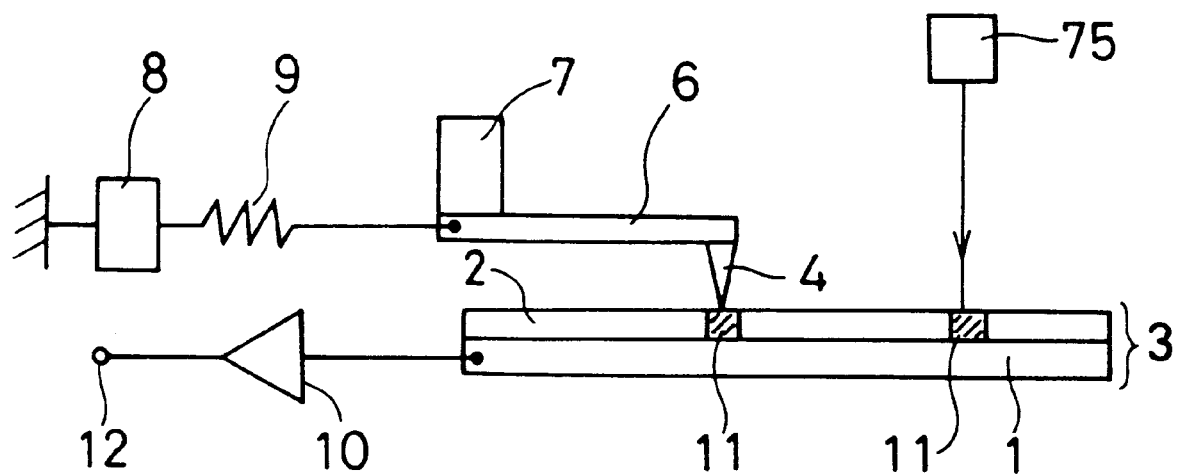
FIG. 4 illustrates a structure of an embodiment of the information recording and reproducing device of FIG. 1.

As FIG. 4 describes, it is also possible to erase the data bit by irradiating a laser beam from a semiconductor laser (output: 30 mW) 75 to the record portion 11 of the recording medium to raise the temperature of the record portion 11.

Figure 5A:
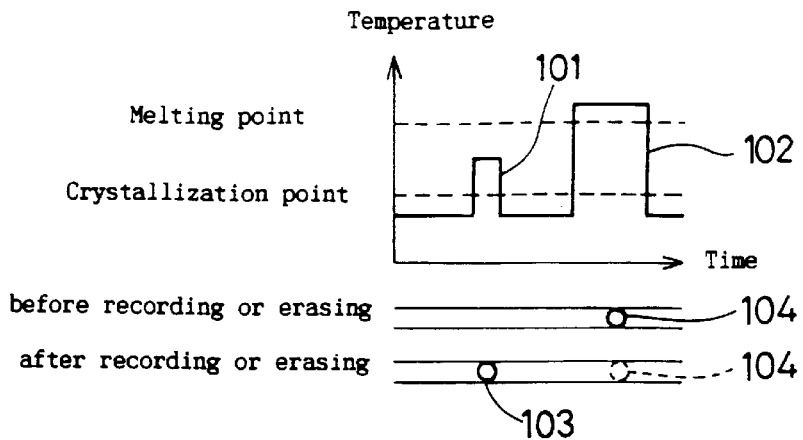
FIGS. 5 (a)–5(c) illustrate a principle of phase change recording in the present invention.
Figure 5B:
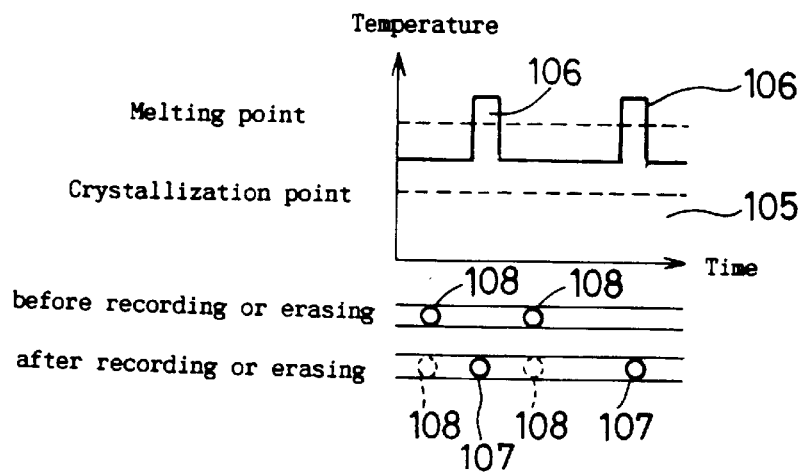
Figure 5C:
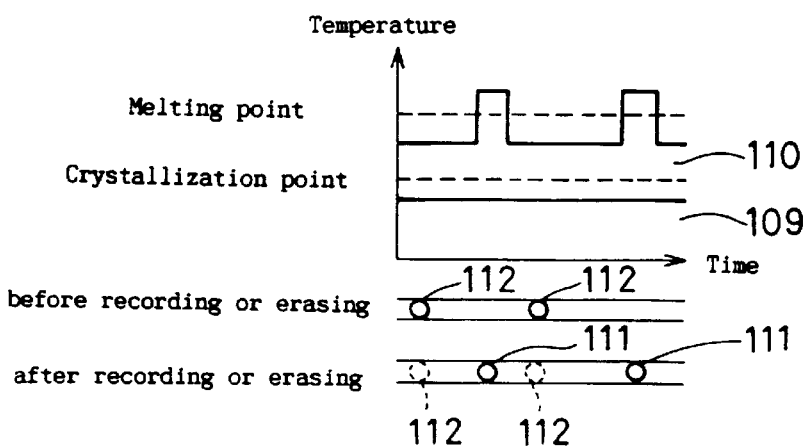

Although recording is conducted by the phase change from the amorphous phase to the crystalline phase in this embodiment, it is also possible to record by phase change from the crystalline phase to the amorphous phase. FIGS. 5(a)–5(c) illustrates the principle of the phase change. FIG. 5 shows an example of a pattern of events at the time of recording or erasing of temperature increase of the recording medium 3 by the heat conduction from the conductive probe 4 and a pattern of events at the time of recording or erasing of temperature increase of the recording medium 3 by the current heat flowing between the conductive probe 4 and the recording medium 3, and its relation with the data bit before and after recording. FIG. 5(a) illustrates when the data bit 15 is formed in the crystalline phase. In this case, data bit is formed by heating the recording medium 3 to a temperature above the crystallization point but below the melting point (temperature increase pattern 101) by current heat to change the state of the recording medium 3 to the crystalline state to form the data bit 103. Further, data bit 103 is erased by heating the recording medium 3 to a temperature above the melting point by current heat (temperature increase pattern 102) by current heat to change the state of the recording medium 3 to the amorphous state to form the date bit 103. Since the crystalline state as the recording state, data can be stably recorded for a long time due to the stability of the crystalline state.

FIGS. 5(b) and 5(c) illustrate the overwrite-type recording or erasing method which records information while erasing a recorded data bit at the same time. In the case of FIG. 5(b), by heating the recording medium by heat conduction to a temperature above the crystallization point but below the melting point (temperature increase pattern 105), followed by further heating by current heat to a temperature over the melting point (temperature increase pattern 106), data bit 105 can be recorded in the amorphous state. Since the unrecorded part is also constantly heated by heat conduction to a temperature over the crystallization point (temperature increase pattern 106), data bit 107 can be recorded in the amorphous state. Since the unrecorded part is also constantly heated by current heat (temperature increase pattern 106) to a temperature above the crystallization point, the data bit 16 previously recorded can be completely erased. By such means, an overwriting operation which records the new data bit 107 while erasing the previously recorded data bit 108 can be conducted. In the case of FIG. 5(c), the data bit 111 can be recorded in the amorphous state by heating the recording medium to a temperature below the crystallization point by heat conduction (temperature increase pattern 109) followed by heating the recording medium in two steps, to a temperature over the crystallization point but below the melting point, and to a temperature over the melting point (temperature increase pattern 110) by the current heat. Further, since an area not to be recorded is also constantly heated to a temperature over the crystallization point, the previously recorded data bit 112 will be erased completely. By such steps, the overwrite operation, or recording a new data bit 111 while erasing the previously recorded data bit 112 can be enabled. In this case, since the phase changes from the crystalline phase to the amorphous phase at the time of recording, the recording operation can be accelerated.

Another means to record a data bit by heating the record medium by current while using the phase change of phase change materials of thermoplastic materials or metals such as Cu, Ag, Au, Zn, Cd, Ga, In, Eu, Gd, Ti, Ge, Pb, Sb, Bi, Te, or alloys combining these metals, or oxide materials or carbide materials as the record medium and heating the surface thereof by the same method as this embodiment is to cause a contour change of the surface of the recording medium such as forming perforation by melting, evaporation, or sublimation can be considered. Also it is possible to use amorphous materials such as GdCo, GdFe, TbFe, DyFe, GdFeBi, GdTbFe, GdFeCo, GdTbFeCo, polycrystalline magnetic materials such as MnBi, MnCuBi, MnAlGe, PtCo, $CrO_2$, CoCr, EuO, PtMnSb, HfTaFe, $CoCrFeO_4$, BiAlGdIG, BiGaYIG, or monocrystalline magnetic materials such as GdIG, BiSmErGaIG, and apply heat by the same means as this embodiment to change the magnetization direction. In this case, the information can be reproduced by detecting the magnetic force between the conductive probe and the record medium as the deflection of the cantilever.

Figure 6:
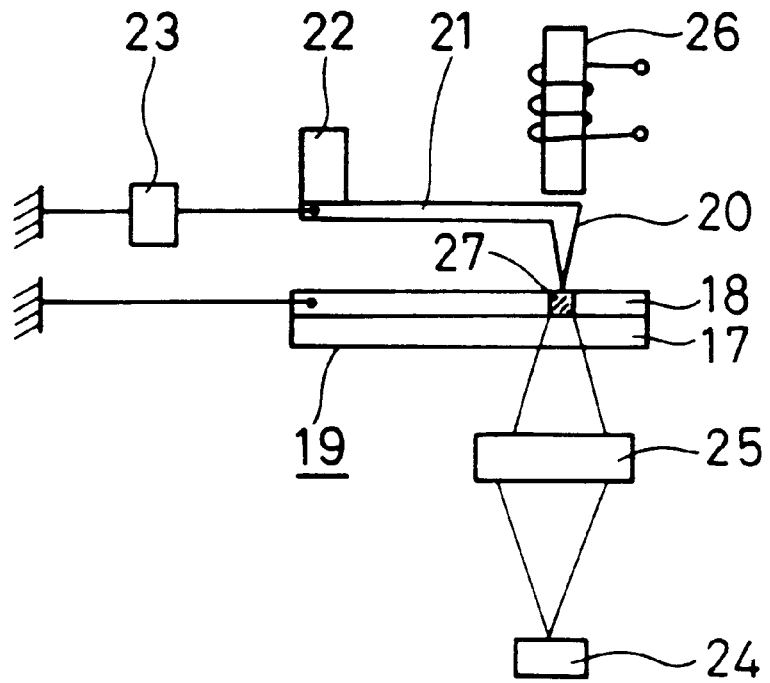
FIG. 6 illustrates a structure of a second embodiment of the information recording and reproducing device of the present invention.

FIG. 6 illustrates a structure of the information recording and reproducing device of an embodiment of the present invention. A Tb—Fe—Co thin film 18 of 50 nm thickness with a transparent substrate of polycarbonate 17 formed thereon is used as the recording medium 19. The probe 20 is a trianglular shaped, Ni foil with the tip bent perpendicular to the direction of the cantilever 21 and is located opposite the recording medium 19. The Ni foil can also function as the cantilever 21 of the magnetic force microscope to alleviate a possible shock caused by a bump to the surface of the recording medium 19 during recording or reproducing, or to read the magnetically recorded data bit by detecting the deflection on the surface of the recording medium 19. The cantilever 21 is attached to the actuator 22 which can move accurately in the X, Y, Z directions. By this structure the probe 20 can move along the surface of the recording medium 19 with the accuracy of 0.1 nm or less. The probe 20 is connected to the power supply 23 which can apply voltage between the probe 20 and the recording medium 19. The laser element 24 and the optical system 25 which concentrates the laser beam from the laser element 24 on the surface of the recording medium 19 to heat the recording medium are disposed below the recording medium 19. The magnetic field generator 26 is disposed above the cantilever 21 to generate the magnetic field in the recording medium 19.

Hereinafter the operation of the recording operation will be illustrated in view of FIG. 6. The recording medium 19 is constantly placed under the magnetic field of 800 Oe by the magnetic field generator 26. The probe 20 moves to the in-place direction at the speed of 2 mm/sec in contact with the surface of the recording medium 19 by the actuator 22. The recording medium 19 is heated to approximately 100° C. by the laser element 24 of 5 mW and a laser beam concentrated to the probe 20 by the optical system 25. Recording information on the recording medium 19 is conducted by applying the pulsed voltage of the pulse duration of 10 μsec between the probe 20 and the recording medium 19 by the power supply 23. The portion to which pulsed voltage is applied 27 is heated by the resistance of the flowing current for 10 μsec to 190° C. to orient the magneization of the recording medium 19 to the external magnetic field. Since the recording medium 19 will be cooled to fix the magnetization direction after applying the pulsed voltage, the data bit can be recorded by this means.

Information is reproduced by measuring the magnetization direction by detecting the magnetic force between the conductive probe 20 and the recording medium 19 as the deflection of the cantilever 21.

Although recording is conducted by voltage modulation in this embodiment, this is not the only recording method. For example, it is also possible to record information by modulating the magnetic field of the magnetic field generator 26 by a laser beam with a direct current constantly applied to keep the area at a temperature of 190° C.

The means to heat the recording medium 19 is not limited only to direct heating with a laser beam. For example, the recording medium can also be heated by heating the probe 20 by a laser beam or a heater and using the heat conduction from the probe 20.

As a magnetic material, amorphous magnetic materials such as GdCo, GdFe, TbFe, DyFe, GdFeBi, GdTbFe, GdFeCo, GdTbFeCo, polycrystalline magnetic materials such as MnBi, MnCuBi, MnAlGe, PtCo, $CrO_2$, CoCr, EuO, PtMnSb, HfTaFe, $CoCrFeO_4$, BiAlGdIG, BiGaYIG, monocrystalline magnetic materials such as GdIG, BiSmErGaIG can be used.

Further it is also possible to record information by using a phase change material containing at least one selected from the group consisting of Ge, Sb, Te, Sn, Ga, Se, Pb, Bi and In as the recording medium, and heating the surface of the recording material by this means to generate the phase change to form a data bit. In this embodiment, information is reproduced by measuring conductivity with the probe similarly to the first embodiment.

It is also possible to record information by using such materials as a thermoplastic material, a metal such as Cu, Ag, Au, Zn, Cd, Ga, In, Eu, Gd, Ti, Ge, Pb, Sb, Bi, Te, an alloy combining the metals, oxides or carbides as the recording medium, and applying heat to the surface thereof by the same means as this embodiment to change the surface contour such as perforation of the recording medium by the material's melting, evaporation, or sublimation. In this case reproduction is conducted by measuring the surface contour with the probe similarly to the first embodiment.

Figure 7:
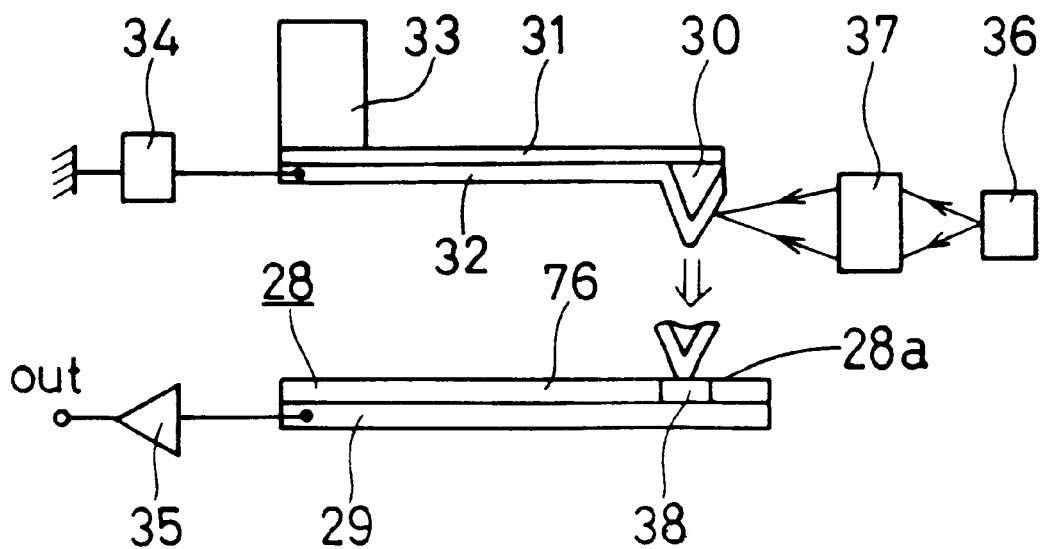
FIG. 7 illustrates a structure of a third embodiment of the information recording and reproducing device of the present invention.

FIG. 7 illustrates a structure of the information recording and reproducing device of another embodiment of the present invention. As can be seen in FIG. 7, a phase change material, a Ge—Sb—Te thin film 76 of 20 nm thickness in an amorphous state is formed on the conductive substrate 29 to be used as the recording medium 28. The cantilever 31 is located opposite to the recording surface 28a of the recording medium 28 and equipped with the probe 30 at the cantilever's free end. The cantilever 31 is formed with a material such as an Si thin film. This structure alleviates a shock caused by a bump between the probe 30 and the recording surface 28a of the recording medium 28 during recording or reproducing. The probe 30 is integrally formed at the tip of the cantilever 31 and the surface of the probe 30 and the cantilever 31 is covered with an Au thin film 32 of 100 nm thickness to improve the conductivity. The cantilever 31 is attached to the actuator 33 which can accurately move in the X, Y, Z directions. By this structure, the probe 30 can move along the surface of the recording medium 28 with the accuracy of 0.1 nm or less. The probe 30 is connected to the power supply 34 so that voltage can be applied to the probe 30 and the recording medium 28. The current flowing between the probe 30 and the recording medium 28 is detected through the current amplifier 35 connected to the conductive substrate 29. In the vicinity of the probe 30 is the laser element 36 having an output of 10 mW and the optical system 37 to heat the probe 30.

Information recording will now be explained in view of FIG. 7. The probe 30 is heated to keep a constant temperature of 300° C. by receiving a concentrated laser beam output from the laser element 36 by the optical system 37. The probe 30 is moved by the actuator 33 at the speed of 2 mm/sec in the direction parallel to the recording surface 28a with the probe 30 and the cantilever 31 not in contact with the recording surface 28a of the recording medium 28. When the tip of the probe 30 reaches the point above the area to record information, the tip of the probe 30 contacts the recording surface 28a of the recording medium 28 for 1 $\mu$sec by the actuator 33. The area of the recording medium 28 contacted by the probe 30 (hereinafter abbreviated to "record portion" 38) is heated to approximately 300° C. to change from the amorphous state to the crystalline state. By this means information is recorded.

The reproduction method of the information recorded is to be further explained. A phase changing material such as Ge—Sb—Te has different conductivity in the crystalline state and the amorphous state. For that reason, information can be read by using the change in the conductivity, for example, as can be seen in FIG. 7, by contacting the conductive probe 30 to the recording surface 28a of the recording medium 28, applying the voltage between the probe 30 and the recording medium 28 by the power supply 34, and detecting the current flowing between the probe 30 and the recording medium 28 through the current amplifier 35. Since the crystalline state and the amorphous state can be distinguished by this means, the information recorded can be read.

Figure 8:
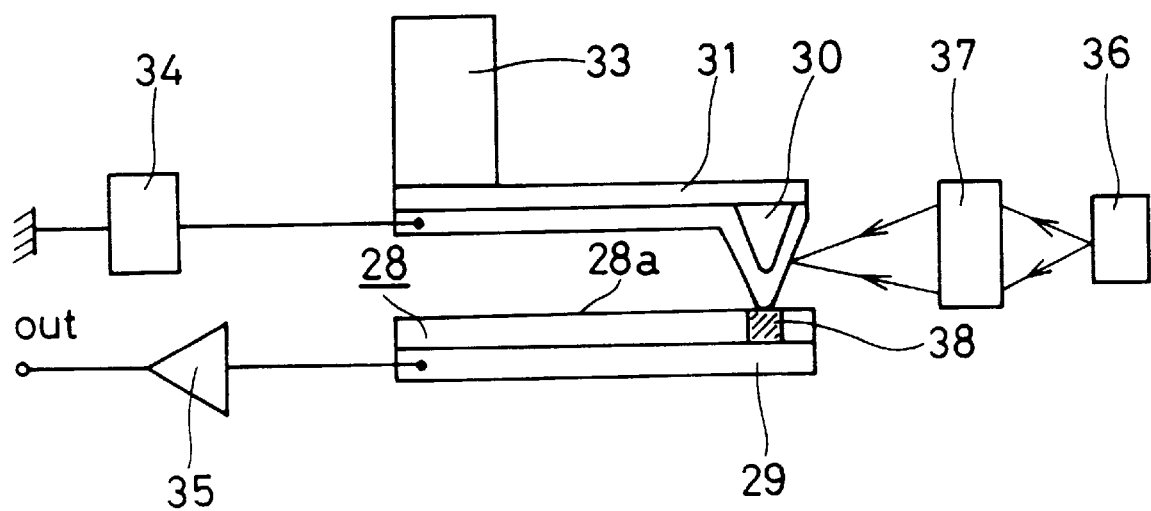
FIG. 8 illustrates a structure of a fourth embodiment of the information recording and reproducing device of the present invention.

FIG. 8 is a structure of the information recording and reproducing device of another embodiment of the present invention. The structure of the embodiment shown in FIG. 7 and the structure of this embodiment are virtually the same but the probe 30 moves in constant contact with the recording surface 28a of the recording medium 28. Therefore, repetitive explanation of simillar elements is omitted.

The recording operation will now be described in view of FIG. 8. The probe 30 moves to the in-place direction at the speed of 2 mm/sec by means of the actuator 33 in contact with the recording surface 28a of the recording medium 28. When the probe 30 reaches the point above the area to be recorded, a pulsed laser beam of a 10 $\mu$sec pulse duration is output from the laser element 36. The laser beam output from the laser element 36 will be concentrated on the probe 30 by the optical system 37 to heat the probe 30. Since the record portion 38 of the recording surface 28a of the recording medium 28 will be heated to approximately 200° C. by heat conduction from the heated probe 30 to change the phase from the amorphous state to the crystalline state, information can be recorded. Since information reproduction in this embodiment is virtually the same as that of the embodiment shown in FIG. 7, further explanation is omitted.

Although the probe 30 is formed at the free end of the cantilever 31 and recording or reproduction is conducted with the probe 30 contacting the recording medium 28 in these two embodiments, the method is not so limited. For example, it is also possible to record the information by attaching the probe 30 to the actuator 33 directly and place the heated probe 30 in close proximity to the recording medium 28 without contact the two, such as at a distance of a few $10^{-1}$ nm to a few nm, to change the state of the recording medium 28. In this case, heat radiated from the heated probe 30 can be used to heat the recording medium 28 to a temperature over the crystallization point. Reproduction can be conducted by applying a voltage to generate a tunnel current which is below the crystallization point and detecting the change of the tunnel current.

Figure 9A:
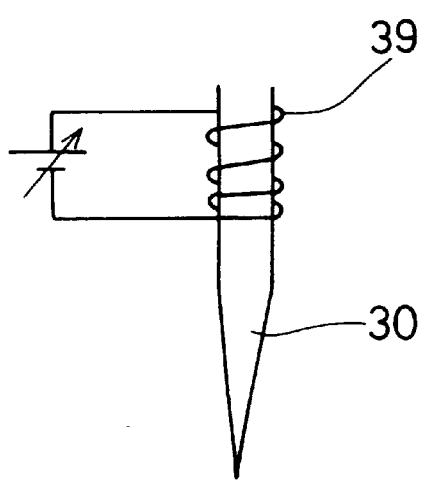
FIGS. 9(a) and 9(b) illustrate the probe heating means using a heater.
Figure 9B:
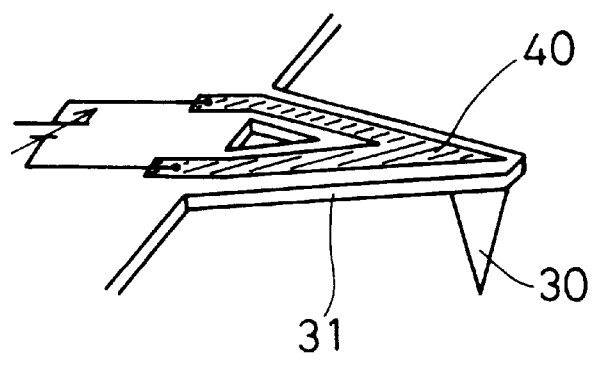

FIGS. 9(a) and(b) illustrate a method to heat the probe 30 by a heater. FIG. 9(a) shows when the probe 30 is heated by a heater 39 installed at the base of the probe 30. When the probe 30 is installed at the tip of the cantilever 31, as FIG. 9(b) illustrates, a resistance material 40 located over the thin film comprising the cantilever 31 can be used to heat the probe 30 utilizing the resistance heat.

In either of the last two embodiments, it is also possible to record the information by using and heating the magnetic materials or the thermoplastic materials described in the first embodiment as the recording medium.

Figure 10:
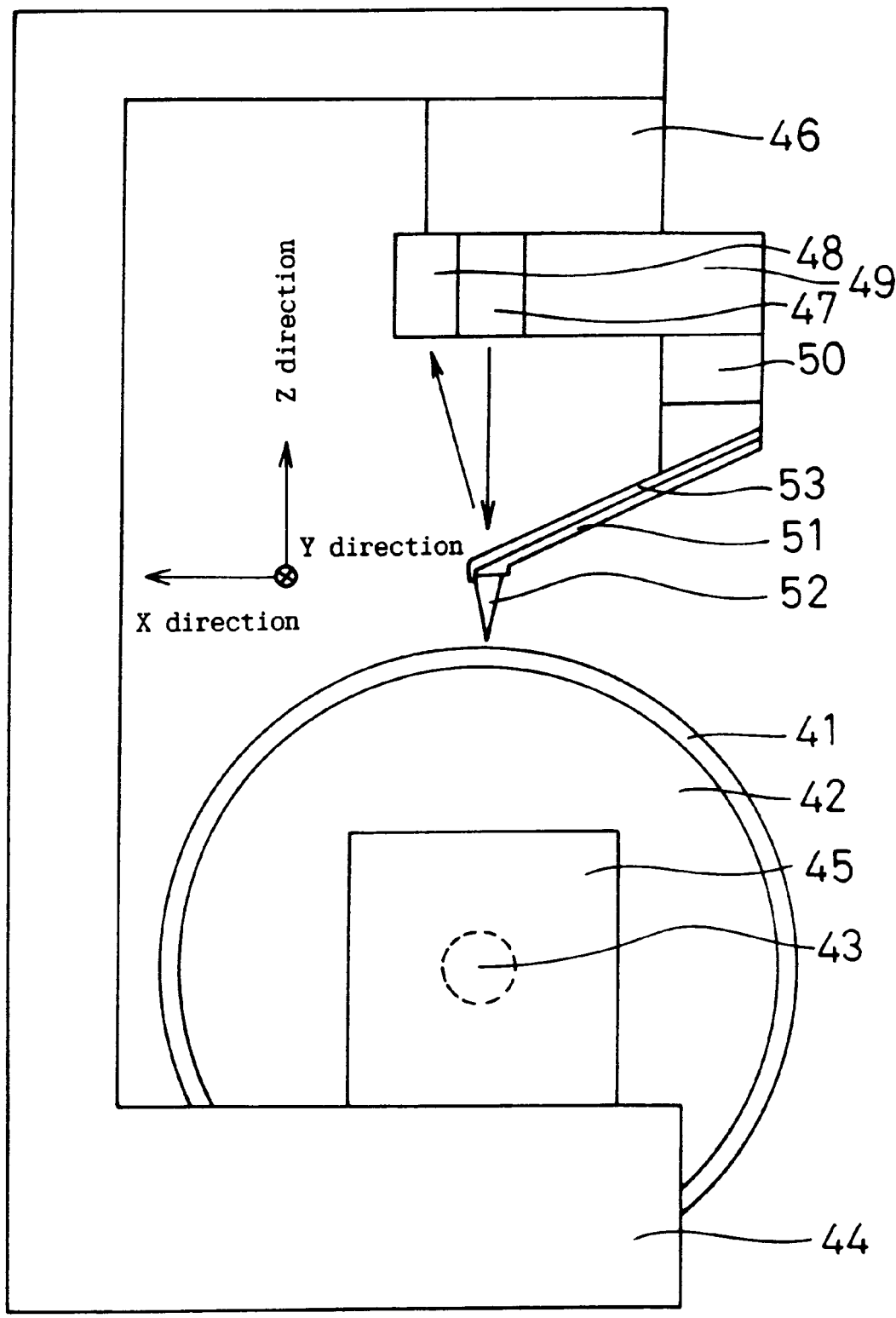
FIG. 10 illustrates a side view of a fifth embodiment of the information recording and reproducing device of the present invention.

FIG. 10 is a side view of the information recording and reproducing device in another embodiment of the present invention.

In FIG. 10, a body of rotation comprising a cylindrical or column shape 42 is supported by a bearing (not shown in FIG. 10) equipped in the base 44 so that the body can rotate around the center axis 43. The center axis 43 of the body of rotation 42 is connected to the rotation drive 45 so that the body of rotation can rotate at a certain speed by means of the rotation drive 45. A recording medium 41 is placed at the rounded plane of the surface of the cylindrical or column shape of the body of rotation 42. For example, the body of rotation 42 can be a metal column having 20 mm diameter and 20 mm length. As the recording medium 41, a phase changing material of 0.05 $\mu$m thickness comprising Ge—Sb—Te alloy is used. The recording medium 41 is formed on the surface of the body of rotation 42 by sputtering. The recording medium 41 is connected electrically to the external via the body of rotation 42.

The base 44 has a linear mover 46 opposite the body of rotation 42. The linear mover 46 has a piezoelectric fine mover 50 through a semiconductor laser 47, a photodiode 48 and a spacer 49. The piezoelectric fine mover 50 has a cantilever 51 opposite the body of rotation 42. A conductive probe 52 is attached to the tip of the free end of the cantilever 51 by adhesion. A metal thin film 53 is placed on the rear side of the cantilever 51, that is, in the plane opposite the semiconductor laser 47 and the photodiode 48. The probe 52, for example, is comprised of a needle-type crystalline of 10 $\mu$m length zinc oxide is attached to the tip of a thin film cantilever 51 comprised of a rectangular silicon nitride of 0.6 $\mu$m thickness, 100 $\mu$m length, 20 $\mu$m width. The specific resistance of the needle-type crystalline of zinc oxide is about several $\Omega$·cm. The probe 52 can be also formed by covering a cantilever having a pyramid-type probe comprising a conventional conductor thin film with a metal at the surface having the probe. The surface of the cantilever 51 is covered with a metal thin film 53 of about 0.1 μm thickness. One end of the metal thin film 53 is connected to the conductive probe 52. By this structure, a laser beam irradiated from the semiconductor laser 47 can be reflected by the metal thin film 53, voltage can be applied to the conductive probe 52, and the conductivity of a very small part of the recording medium 41 can be measured. For example, the semiconductor laser 47 is a red light semiconductor laser, and the photodiode 48 is a half-split photodiode. The semiconductor laser 47 and the photodiode 48 irradiate a laser beam on the cantilever 51 and detect the reflected beam and comprise a photolever. By the photolever, the displacement (deflection) of the cantilever 51 can be detected and the force between the probe 52 and the recording medium 41 can be measured by the spring constant of the cantilever 51.

The piezoelectric fine mover 50 controls the movement of the probe 52 in the direction perpendicular to the surface of the recording medium 41 (Z direction), in the direction of the recording medium 41 movement below the probe 52 (X direction), and in the direction orthogonal to both the X direction and the Z direction (Y direction). The linear mover 46 moves the probe 52, the cantilever 51 and the cantilever's displacement measuring system (the semiconductor laser 47 and the photodiode 48), the piezoelectric fine mover 50, drastically in the Y direction. By controling the piezoelectric fine mover 50 and the linear mover 46 in the Y direction, data column tracking can be conducted. The linear mover 46 and the rotation drive 45 are attached to the base 44 with high solid rigidity to maintain the high resonant frequency of the device as a whole.

Information recording and reproducing operation using the information recording and reproducing device of the above-mentioned embodiment will be explained.

The body of rotation 42 is rotated at the speed that the recording medium 41 moves to the point below the probe 52 of 1 cm/sec by the rotation drive 45. Then the force applied from the probe 52 of the recording medium 41 is detected by irradiating a laser beam by the semiconductor laser 47 to the metal thin film of the cantilever 51 and detecting the reflected beam at the photodiode 48. The probe 52 is feedback-controlled by the piezoelectric fine mover 50 in the Z direction to keep the detected force at a certain strength to keep the force applied from the probe 52 to the recording medium 41 at a certain value (approximately $1 \times 10^{-8}$ N). The displacement of the recording surface to the direction of the radius of the body of rotation 42 (Z direction) subsequent to the recording medium 41 rotation is by micron order. However, since the spring constant of the cantilever 51 is as small as 0.3 N/m (flexible), the time constant of the feedback control need not be smaller than the cycle of the ruggedness of the recording surface of the recording medium 41. The surface of the recording medium 41 remains intact even when the time constant of the feedback control is on the order of a msec by applying the pulsed voltage of 5 V for 1 μsec to the probe 52 via the metal thin film 53 every 2 μsec. By this, a current flows in a very small area of the recording medium 41 in the amorphous state to heat the very small area to a temperature above the crystallization point to change the very small area to the crystalline state. By this means information is recorded. The track pitch used is 0.1 μm. If the operation is conducted in such an area having a small repulsion, it is possible to reduce the friction force between the probe 52 and the recording medium 41 and accelerate the recording and reproducing speed.

Information reproduction is conducted similarly to the recording, namely by rotating the recording medium 41 with the probe 52 contacting thereto and applying 0.1 V voltage to the probe 52 and detecting the current between the metal thin film 53 and the body of rotation 42. The displacement in the Y direction at the reproduction subsequent to the rotation of the recording medium 41 is less than 0.03 μm, and therefore it is possible to easily track the information recorded by the 1 μm track pitch.

By placing the direction connecting the fixed end and the free end of the cantilever 51 orthogonal to the center axis 43 of the body of rotation 42, errors in data recording or reproducing can be drastically reduced because the ability of the probe 52 to follow the recording surface of the recording medium 41 is improved by the relationship between the cantilever 51 and the body of rotation 42.

By forming the body of rotation 42 which is the recording body 41 with a material having a coefficient of thermal expansion at a room temperature of $3 \times 10^{-6}$/° C. or less, tracking is further stabilized. As such a material, an invar alloy is most appropriate. The invar alloy is the alloy containing 36.5 per cent of nickel and 63.5 per cent of iron.

Further by applying a liquid inert to the recording medium 41 and the probe 52, such as silicon oil of small viscosity to the surface of the recording medium 41 or keeping the whole device including the probe 52 and the recording medium 41 in a silicon oil of small viscosity, it is possible to prevent the deterioration of the recording medium 41 and the probe 52, increase stability to a thermal change, and enable the stabilized operation in a long term.

Figure 11:
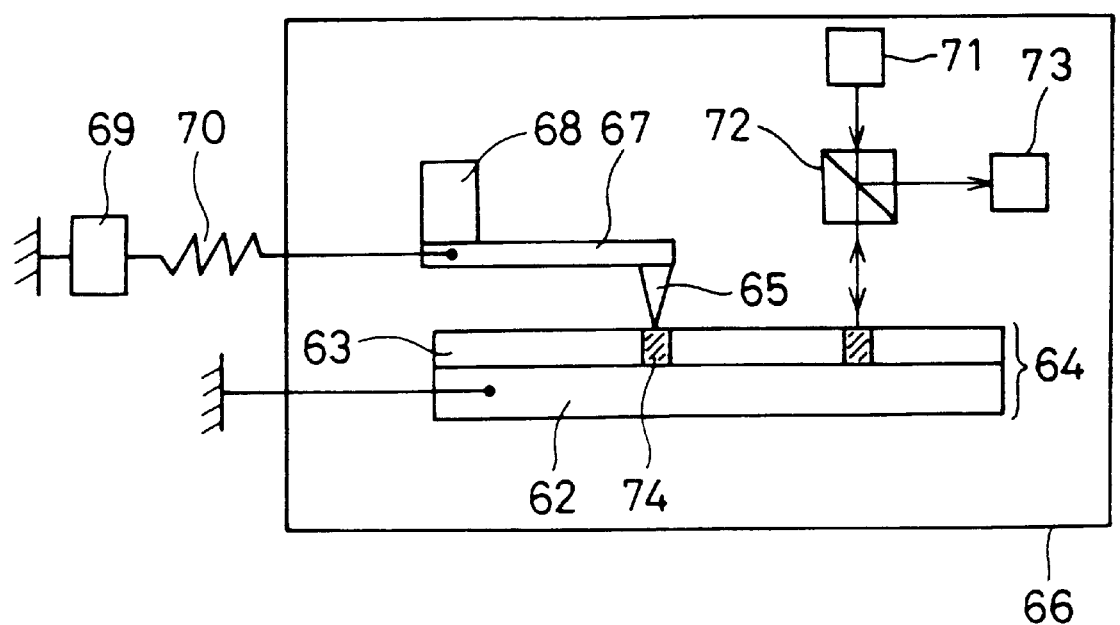
FIG. 11 illustrates a structure of a sixth embodiment of the information recording and reproducing device of the present invention.

FIG. 11 illustrates a structure of the information recording and reproducing device of the present invention. As shown in FIG. 11, a phase change material, $GeSb_2Te_4$ thin film 63 of 20 nm thickness in the amorphous state is formed on the conductive substrate 62 to be used as the recording medium 64. That is, the material having a large resistance value in the initial condition is used as the recording medium 64. A conductive probe 65 placed opposite to the recording medium 64 is formed integrally with the tip of the cantilever 67 comprised of a SiN thin film. With this structure, possible shock caused by the bump against the surface of the recording medium 64 at the time of recording or reproducing can be alleviated. The surface of the cantilever 67 and the conductive probe 65 are covered with an Au thin film having 100 nm thickness to provide conductivity. To prevent oxidation of the surface of the phase change material ($GeSb_2Te_4$ thin film) 63, the recording medium 64 and the conductive probe 65 are placed in a box 66 filled with nitrogen. The cantilever 67 is attached to an actuator 68 which can move accurately in the X, Y, Z directions. By the actuator, the conductive probe 65 can be moved accurately along the surface of the recording medium 64 with the accuracy of 0.1 nm or less. The conductive probe 65 is connected to a power supply 69 which applies voltage between the conductive probe 65 and the recording medium 64 via a protection resistance 70 of 1 MΩ. By means of applying a voltage between the conductive probe 65 and the recording medium 64, the phase of the recording medium 64 changes by the resistance heat of the current flowing between the conductive probe 65 and the recording medium 64 to record or erase the data bit. To reproduce the information recorded on the recording medium 64, a laser beam from a semiconductor laser 71 of output 1 mW irradiates the recording medium 64 via a half mirror 72, and the reflected beam is detected by the optical detector 73.

Hereinafter the recording operation will be explained with reference to FIG. 11. The conductive probe 65 moves by means of the actuator 68 to the in-place direction at 2 mm/sec while in contact with the surface of the recording medium 64. When the conductive probe 65 reaches the point to be recorded, a pulsed voltage of 3 V for 10 μsec is applied between the recording medium 64 and the conductive probe 65 by the power supply 69. A portion of the recording medium 64 not receiving the pulsed voltage does not reach the crystallization point and stays in the amorphous state (initial state). Whereas, since the contact portion (record portion) 74 contacting the conductive probe 65 of the recording medium 64 is heated by the resistance heat of the flowing current for 10 μsec (a time longer than the crystallization time of a phase changing material, a $GeSb_2Te_4$ thin film 63 in the amorphous state) to approximately 200° C. [a temperature higher than the crystallization point but lower than the melting point (approximately 600° C.) of a phase change material, a $GeSb_2Te_4$ thin film 63 in the amorphous state] to change from the amorphous state to the crystalline state, information recording can be conducted.

When a material having a small resistance value in the initial condition (a phase change material in the crystalline state) is used as the recording medium 64, by heating the phase changing material to a certain temperature over the melting point to change from the crystalline state to the amorphous state, a data bit can be recorded.

Next reproducing the recorded in formation will be explained. Since a phase change material such as $GeSb_2Te_4$ has a different refractive index in the crystal line state and the amorphous state, the recorded information can be read using the change in refractive index. That is, by irradiating a laser beam and detecting the reflected beam, the crystalline state and the amorphous state can be distinguish ed. Accordingly, as described in FIG. 11, a recorded data bit is reproduced by irradiating a laser beam from the semiconductor laser 71 via the half mirror 72 to the recording medium 64 and detecting the reflected beam via the half mirror 72 by the optical detector 73. Since the laser beam is used only in reproducing data bit, the laser element need not be of a high output. Therefore an inexpensive information recording and reproducing device can be provided.

Recorded information can be erased as in the first embodiment by heating the record portion 74 of the recording medium 64 to the melting point followed by quenching.

When a material having a small resistance value in the initial condition (a phase change material in the crystalline state) is used as the recording medium 64, by heating the phase change material for a certain time longer than the solidifying time of the phase changing material to a certain temperature above the crystallization point but below the melting point of the phase change material to change the phase of the material from the amorphous state to the crystalline state, data bit can be erased.

Figure 12:
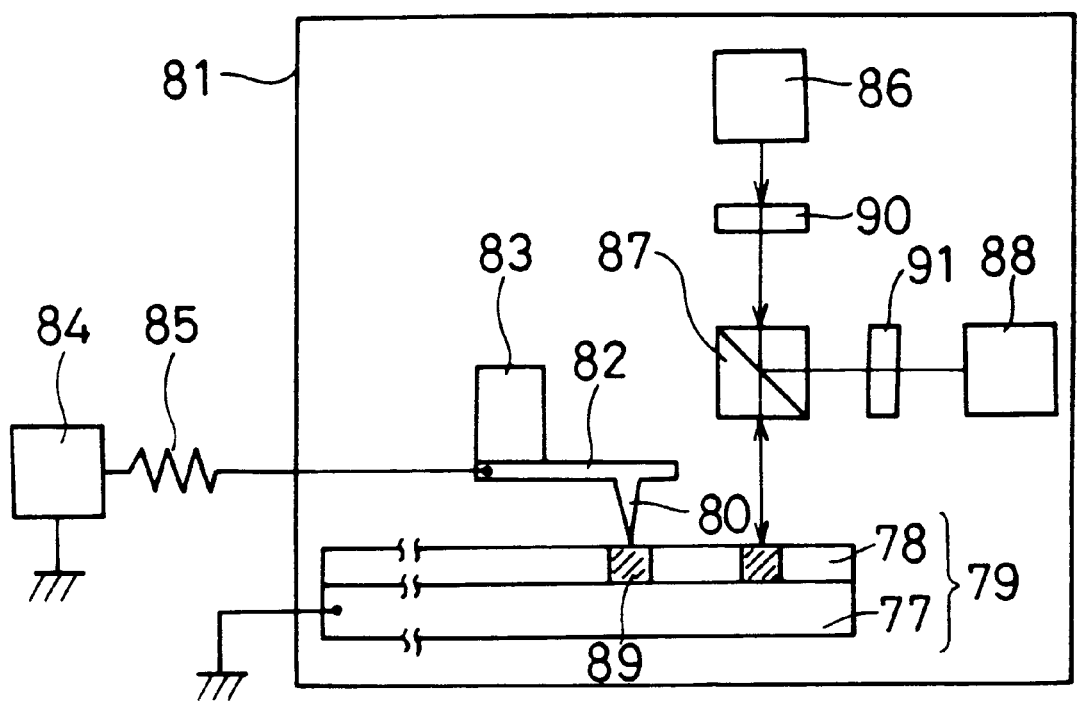
FIG. 12 illustrates a structure of a seventh embodiment of the information recording and reproducing device of the present invention.
Figure 14:
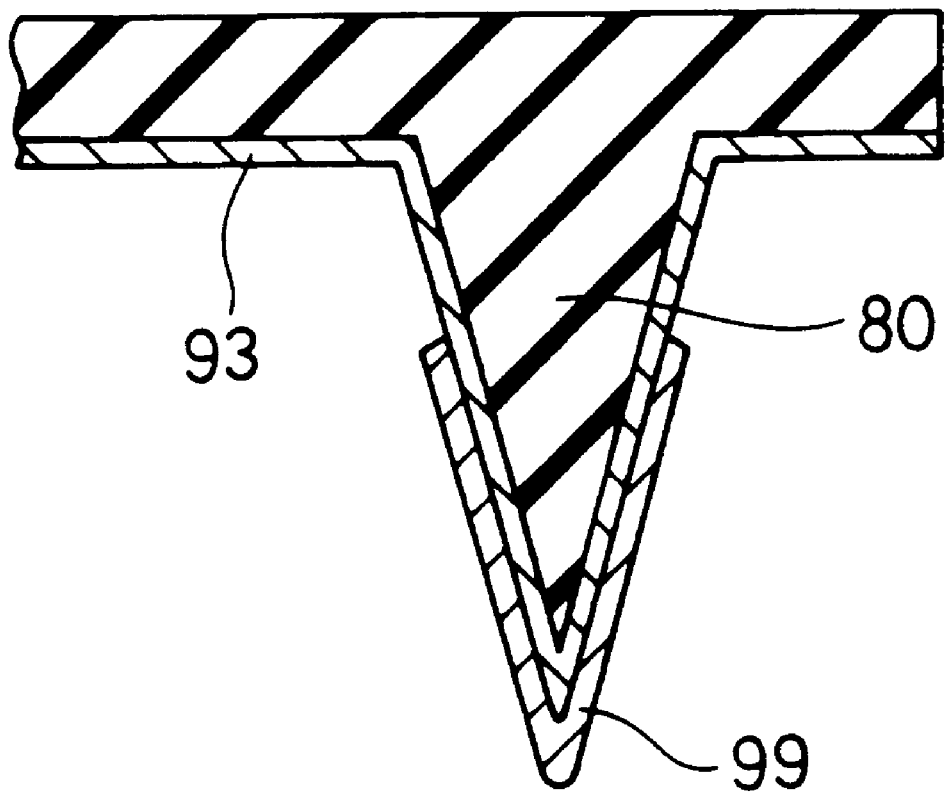
FIG. 14 illustrates an embodiment of the conductive probe of the information recording and reproducing device of FIG. 12.

FIG. 12 illustrates a structure of the information recording and reproducing device of the present invention. As shown in FIG. 12, a magnetic material, Tb—Fe—Co thin film 78 of 20 nm thickness in the amorphous state is formed on the conductive substrate 77 to be used as the recording medium 79. The Tb—Fe—Co thin film 78 is magnetized to the direction perpendicular to the surface of the recording medium 79. The conductive probe 80 located opposite to the recording medium 79 is formed integrally with the tip of the cantilever 82 comprised of an SiN thin film. With this structure, possible shock caused by a bump against the surface of the recording medium 79 during recording or reproducing can be alleviated. The surface of the cantilever 82 and the conductive probe 80 are covered with a metal film 93 of 100 nm thickness to provide conductivity as shown in FIG. 14. Further, to prevent oxidation of the surface of the magnetic material, the Tb—Fe—Co thin film 78, the recording medium 79 and the conductive probe 80 are placed in a box 81 filled with nitrogen as illustrated in FIG. 12. The cantilever 82 is attached to an actuator 83 which can move accurately in the X, Y, Z directions. By the actuator, the conductive probe 80 can be moved accurately along the surface of the recording medium 79 with the accuracy of less than 1 nm. The conductive probe 80 is connected to a power supply 84 which applies voltage between the conductive probe 80 and the recording medium 79 via protection resistance 85 of 1 MΩ. Since by applying the voltage between the conductive probe 80 and the recording medium 79 the recording medium 79 is partially heated to a temperature over the Curie point by the resistance heat of the current flowing between the conductive probe 80 and the recording medium 79, the magnetization direction of the part changes to record or erase the data bit. To reproduce the information recorded on the recording medium 79, a laser beam from a semiconductor laser 86 of output 1 mW is irradiated to the recording medium 79 via a polarizer 90 and a beam splitter 87 and the reflected beam is detected by the optical detector 88.

Figure 13:
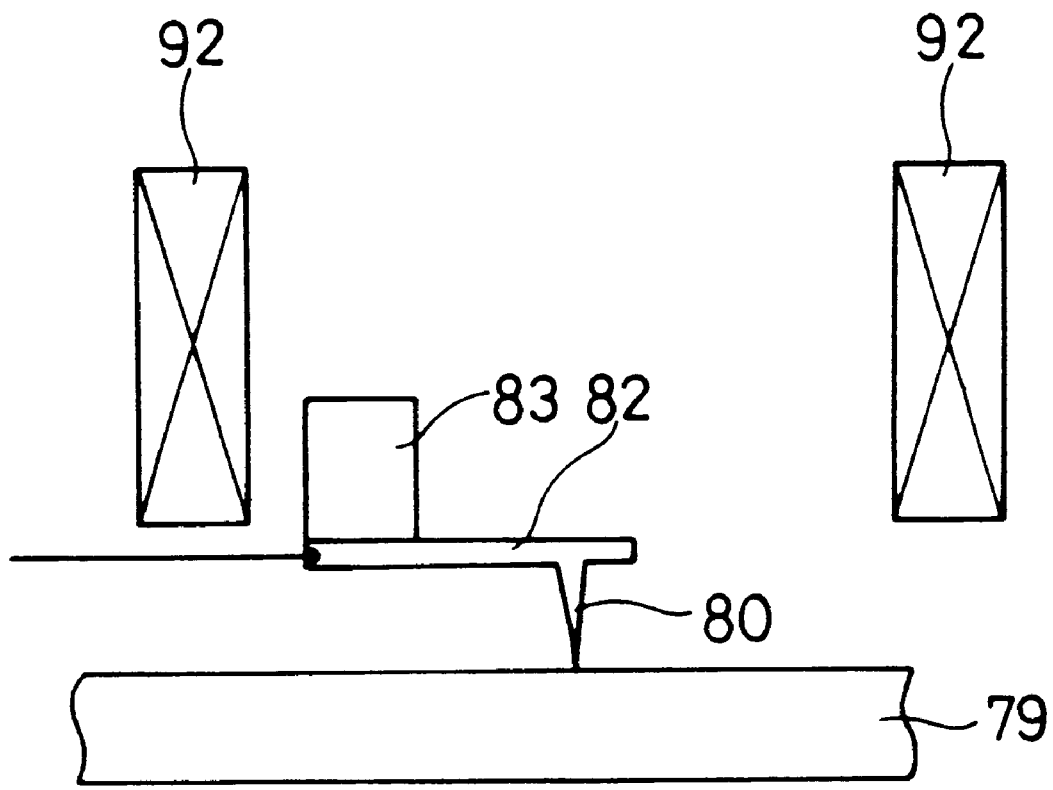
FIG. 13 illustrates the vicinity of the recording medium of an embodiment of the information recording and reproducing device of FIG. 12.

Hereinafter the recording operation will be explained with reference to FIG. 12. The conductive probe 80 moves by the actuator 83 to the in-place direction at 2 mm/sec while contacting the surface of the recording medium 79. When the conductive probe 80 reaches the point to be recorded, a pulsed voltage of 3 V for 10 μsec is applied between the recording medium 79 and the conductive probe 80 by the power supply 84. The contact portion (record portion) 89 of the recording medium 79 contacting the conductive probe 80 is heated to approximately 200° C. by the resistance heat of the flowing current to exceed the Curie point of the magnetic material, Tb—Fe—Co thin film 78. Consequently the magnetization direction of the heated portion will be influenced by the magnetic field of the surrounding portion to be magnetized to the direction opposite the surrounding portion's. Namely, if the whole portion of the recording medium 79 is originally magnetized in the upper direction, the heated portion will be magnetized in the lower direction. Information can be recorded by such magnetization direction change. In this case, if a magnetic field is additionally applied by means of a coil 92 as shown in FIG. 13, at least to the portion the conductive probe 80 is contacting, the magnetization direction of the area of the recording medium 79 to be recorded can be changed for certain to provide recording and reproducing of high SN ratio.

By comprising at least the tip of the conductive probe 80 located at the tip of the cantilever 82 with a conductive magnetic material 99 having a large magnetic permeability such as Co, Ni, Fe as shown in FIG. 14, the line of magnetic force can be focused at the tip of the conductive probe 80 even when a small external magnetic field is used to secure the recording and reduce the bit area to realize densification.

Next reproduction of the information recorded will be explained. As FIG. 12 shows, the portion with the changed magnetization direction (where information is recorded) 89 can be read by the interaction of the beam and the magnetic by means of a laser beam. There are methods of transmitting a laser beam to a magnetic material to detect the transmitted beam using Faraday effect or irradiating a laser beam to a magnetic material to detect the reflected beam using magnetic Kerr effect. In this embodiment, recorded information is reproduced using magnetic Kerr effect.

A laser beam from the semiconductor laser 86 is irradiated to the recording medium 79 via the polarizer 90 and the beam splitter 87. The polarization angle of the reflected beam from the recording medium 79 changes depending upon the surface magnetization direction of the recording medium 79. The change is detected by the optical detector 88 as the light intensity after passing through the beam splitter 87 and the analyzer 91. By this procedure, the information recorded on the recording medium 79 can be reproduced.

It is also possible to comprise the conductive substrate 77 with a transparent material, such as a glass substrate having a transparent conductive film formed thereon, and penetrate a laser beam to detect the change of the polarization angle caused by the surface magnetization direction of the recording medium 79 by Faraday effect.

The erasure operation of the recorded information will now be explained. In principle, erasure is conducted similar to recording, namely, by applying a pulsed voltage between the recording medium 79 and the conductive probe 80 to heat the magnetic material to a temperature over the Curie point. The data bit can be erased by setting the direction of magnetic field to be applied from the external to be the same as the magnetization direction of the unrecorded portion of the magnetic material.

Although in this embodiment, Tb—Fe—Co is used as the magnetic material used for the recording medium 79, it is not so limited but any amorphous material comprising at least one selected from the group consisting of Tb, Gd and Dy. For example, Gd compounds such as Gd—Fe—Co, Gd—Tb—Fe, Gd—Fe—Bi, Gd—Fe, or Dy—Fe, Tb—Fe can be used as well. Such magnetic materials secure stable operation for a long time. These magnetic materials have high sensitivity when the laser beam has the wavelength of 600–900 nm. When a short wavelength laser beam such as green is used for reproduction, by using one material selected from the group consisting of Pt—Co, Co—Cr and $CrO_2$ as the magnetic material, high SN ratio and high sensitivity can be secured in the reproduction.

Although the coil 92 is used as the means to generate external magnetic field in this embodiment, it is not so limited but other materials, such as a permanent magnet can be used as well.

Although only a few embodiments have been described in detail above, those having ordinary skill in the art will certainly understand that many modifications are possible without departing from the teachings thereof.

All such modifications are intended to be encompassed within the following claims.

We claim:

1. An information recording and reproducing device comprising:

an inorganic recording medium comprising at least one material selected from the group consisting of a phase change material, a shape changing material and a magnetic material, and a conductive probe being proximate to or contacting a recording surface of said recording medium and movable relative to said recording medium, wherein information is recorded by heating said recording medium in the area where said conductive probe is proximate or contacting to change a physical state therein and wherein the area of said recording medium where said conductive probe is proximate or contacting is heated by a light irradiating device to irradiate a light in a certain area of said recording medium.

2. The information recording and reproducing device as claimed in claim 1, wherein said light irradiating device comprises a laser element and an optical system to concentrate a laser beam irradiated from said laser element on said recording medium.

3. An information recording and reproducing device comprising:

an inorganic recording medium comprising at least one material selected from the group consisting of a phase chance material, a shape changing material and a magnetic material, and a conductive probe being proximate to or contacting a recording surface of said recording medium and movable relative to said recording medium, wherein information is recorded by heating said recording medium in the area where said conductive probe is proximate or contacting to change a physical state therein and wherein the area of said recording medium where said conductive probe is proximate or contacting is heated by a voltage applying means for applying voltage between said conductive probe and said recording medium.

4. An information recording and reproducing device comprising:

an inorganic recording medium comprising at least one material selected from the group consisting of a phase change material, a shape changing material and a magnetic material, and a conductive probe being proximate to or contacting a recording surface of said recording medium and movable relative to said recording medium, wherein information is recorded by heating said recording medium in the area where said conductive probe is proximate or contacting to change a physical state therein;

wherein the state change of said phase change material is from the first phase to the second phase; and wherein information is recorded by heating a certain area of said recording medium comprised of said phase change material in an amorphous state for a time longer than a crystallization state and to a temperature higher than a crystallization point but lower than a melting point to change the state of said area from the amorphous state to the crystalline state.

5. The information recording and reproducing device as claimed in claim 4, wherein said information is recorded on said recording medium in the amorphous state and is erased by heating said recorded portion of said recording medium for a time longer than the crystallization time to a temperature higher than the crystallization point but lower than the melting point to change the phase of said recorded portion from the amorphous state to the crystalline state.

6. An information recording and reproducing device comprising:

an inorganic recording medium comprising at least one material selected from the group consisting of a phase change material, a shape chancing material and a magnetic material, and a conductive probe being proximate to or contacting a recording surface of said recording medium and movable relative to said recording medium, wherein information is recorded by heating said recording medium in the area where said conductive probe is proximate or contacting to change a physical state therein;

wherein the state change of said recording medium comprised of said magnetic material is a change in magnetization direction.

7. The information recording and reproducing device as claimed in claim 6, wherein the temperature of the heat applied to said recording medium is above the point to reverse the magnetization direction of said magnetic material.

8. The information recording and reproducing device as claimed in claim 6, further comprising a magnetic field generator to apply a magnetic field to said recording medium.

9. An information recording and reproducing device comprising:

an inorganic recording medium comprising at least one material selected from the group consisting of a phase change material, a shape changing material and a magnetic material, and a conductive probe being proximate to or contacting a recording surface of said recording medium and movable relative to said recording medium, wherein information is recorded by heating said recording medium in the area where said conductive probe is proximate or contacting to change a physical state therein and further comprising a cantilever having a fixed end and a free end, said conductive probe is located at said free end of said cantilever.

10. The information recording and reproducing device as claimed in claim 9, wherein said conductive probe and said cantilever are formed integrally, and said conductive probe comprises the tip of said free end of said cantilever bent approximately at a right angle.

11. The information recording and reproducing device as claimed in claim 9, wherein at least the tip of said conductive probe located at said free end of said cantilever comprises a magnetic material of a large magnetic permeability.

12. The information recording and reproducing device as claimed in claim 9, further comprising means to detect the displacement of said cantilever when said conductive probe is proximate to or contacting said surface of said recording medium.

13. The information recording and reproducing device as claimed in claim 12, wherein said conductive probe comprises a magnetic material.

14. An information recording and reproducing device comprising:

an inorganic recording medium comprising at least one material selected from the group consisting of a phase chance material, a shape changing material and a magnetic material, and a conductive probe being proximate to or contacting a recording surface of said recording medium and movable relative to said recording medium, wherein information is recorded by heating said recording medium in the area where said conductive probe is proximate or contacting to change a physical state therein wherein the recorded information is reproduced by said conductive probe proximate to or contacting the surface of said recording medium; and wherein said information is reproduced by means for measuring the surface contour of said recording medium.

15. The information recording and reproducing device as claimed in claim 14, wherein said means for measuring the surface contour of said recording medium comprises a position detecting device to detect the position of said conductive probe, wherein surface contour of said recording medium is measured by detecting the position of said conductive probe contacting the surface of said recording medium by said position detecting device.

16. An information recording and reproducing method comprising:

(a) locating a conductive probe proximate to or contacting an inorganic recording medium comprising at least one material selected from the group consisting of a phase changing material, a shape changing material and a magnetic material, and (b) heating a certain area of said recording medium to which said conductive probe is proximate or contacting to record information on said recording medium by changing a physical state of the area of said recording medium to which said conductive probe is proximate or contacting, and (c) heating the area of said recording medium to which said conductive probe is contacting by applying voltage between said conductive probe and said recording medium.

17. An information recording and reproducing method comprising:

(a) locating a conductive probe proximate to or contacting an inorganic recording medium comprising at least one material selected from the group consisting of a phase changing material, a shape changing material and a magnetic material, and (b) heating a certain area of said recording medium to which said conductive probe is proximate or contacting to record information on said recording medium by changing a physical state of the area of said recording medium to which said conductive probe is proximate or contacting, and (c) heating the area of said recording medium to which said conductive probe is proximate or contacting by irradiating a light thereto.

18. An information recording and reproducing method comprising:

(a) locating a conductive probe proximate to or contacting an inorganic recording medium comprising at least one material selected from the group consisting of a phase changing material, a shape changing material and a magnetic material, and (b) heating a certain area of said recording medium to which said conductive probe is proximate or contacting to record information on said recording medium by changing a physical state of the area of said recording medium to which said conductive probe is proximate or contacting, and (c) changing the state of said phase change material from the first phase to the second phase, and (d) recording information on said recording medium by heating a certain area of said recording medium comprising a phase change material in an amorphous state in the initial condition for a time longer than a crystallization state at a temperature higher than a crystallization point but lower than a melting point of said phase changing material to change the phase of the area from the amorphous state to the crystalline state.

19. An information recording and reproducing method comprising:

(a) locating a conductive probe proximate to or contacting an inorganic recording medium comprising at least one material selected from the group consisting of a phase changing material, a shape changing material and a magnetic material, and (b) heating a certain area of said recording medium to which said conductive probe is proximate or contacting to record information on said recording medium by changing a physical state of the area of said recording medium to which said conductive probe is proximate or contacting, and (c) reproducing information by said conductive probe located proximate to or contacting the surface of said recording medium, and (d) reproducing information by measuring the surface contour of said recording medium.

20. An information recording and reproducing method comprising:
   (a) locating a conductive probe proximate to or contacting an inorganic recording medium comprising at least one material selected from the group consisting of a phase changing material, a shape changing material and a magnetic material, and
   (b) heating a certain area of said recording medium to which said conductive probe is proximate or contacting to record information on said recording medium by changing a physical state of the area of said recording medium to which said conductive probe is proximate or contacting, and
   (c) changing the state of said magnetic material by changing a magnetization direction.

21. The information recording and reproducing method as claimed in claim 20, further comprising:
   (d) applying an external magnetic field to said recording medium at least in the recording area.

22. The information recording and reproducing method as claimed in claim 20, further comprising:
   (d) recording information by heating said magnetic material to a temperature higher than a temperature to reverse the magnetization direction of said magnetic material.

23. The information recording and reproducing method as claimed in claim 20, further comprising:
   (d) erasing information by reversing the magnetization direction of said magnetic material by applying a voltage to generate a certain current between said conductive probe and said recording medium to heat at a temperature higher than the point to reverse the magnetization direction of said magnetic material.

* * * * *